United States Patent [19]

Blust, Sr. et al.

[11] Patent Number: 4,465,422
[45] Date of Patent: Aug. 14, 1984

[54] METHODS AND APPARATUS FOR THREADING A PIPE

[75] Inventors: Donald L. Blust, Sr., Palestine; Jerome J. Pope, Waller; Lawrence L. Troxell, Jr., Navasota, all of Tex.

[73] Assignee: The Pope Company, Inc., Houston, Tex.

[21] Appl. No.: 202,130

[22] Filed: Oct. 30, 1980

[51] Int. Cl.³ .............................................. B21D 43/00
[52] U.S. Cl. ............................... 414/433; 10/107 PH; 74/421 R; 74/606 R; 82/2.5; 82/38 R; 408/45; 408/53; 414/745; 414/748; 414/749
[58] Field of Search ........ 10/89 WH, 107 PH, 107 R, 10/107 F; 82/2.5, 2.7, 38 R, 45, 101; 408/64, 66, 69, 70, 71, 45, 49, 50, 53; 414/433, 745, 748, 749; 74/421 R, 606 R

[56] References Cited

U.S. PATENT DOCUMENTS

| | | | |
|---|---|---|---|
| 2,210,531 | 8/1940 | Engelbaugh et al. | 408/70 X |
| 2,680,287 | 6/1954 | Wilson | 414/745 X |
| 2,690,572 | 10/1954 | Thompson et al. | 82/48 X |
| 3,055,245 | 9/1962 | McKay | 414/745 X |
| 3,090,499 | 5/1963 | Hieber et al. | 414/748 |
| 3,435,962 | 4/1969 | Goeppel | 414/748 |
| 3,535,963 | 10/1970 | Dietl | 82/38 R |
| 3,985,221 | 10/1976 | Lueders | 82/2.7 X |
| 4,028,926 | 6/1977 | Olesovsky | 414/745 X |
| 4,076,136 | 2/1978 | Jenkin | 414/745 X |
| 4,295,396 | 10/1981 | Hasslauer | 82/2.5 X |
| 4,300,672 | 11/1981 | Millar et al. | 414/745 X |

FOREIGN PATENT DOCUMENTS

| | | | |
|---|---|---|---|
| 661382 | 4/1963 | Canada | 74/606 R |
| 254766 | 6/1967 | Denmark | 414/745 |
| 499626 | 7/1930 | Fed. Rep. of Germany | 82/38 |
| 951951 | 12/1960 | United Kingdom | 74/606 R |

OTHER PUBLICATIONS

Precision Instrument Components Design Corp., Supplement Catalog #24, 1961, p. 7.

Primary Examiner—Robert J. Spar
Assistant Examiner—Janice Krizek
Attorney, Agent, or Firm—Carwell & Helmreich

[57] ABSTRACT

Methods and apparatus are provided for handling and threading tubular products, including tubing, pipe, and casing for the petroleum production industry. In one embodiment of the present invention, an improved pipe handling system is utilized to transfer segments of pipe sequentially to a press, a threading machine, and quality control stations. The pipe handling system may include a plurality of plates driven by a common motor for raising and positioning the pipe, V-rollers for supporting and pre-positioning the pipe, a powered cart for transporting the pipe to the threading machine, and a plurality of steady rest assemblies for supporting a joint of rotating pipe during the threading operation.

32 Claims, 19 Drawing Figures

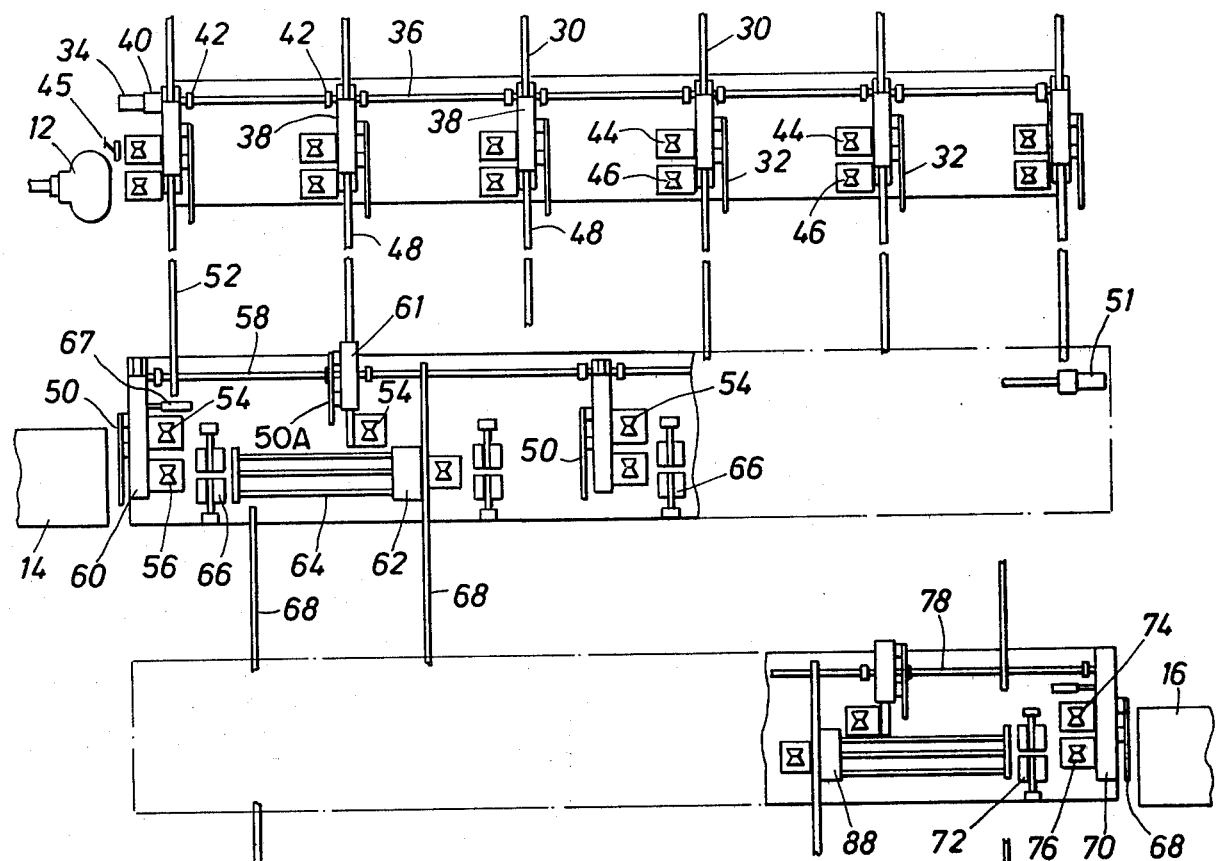
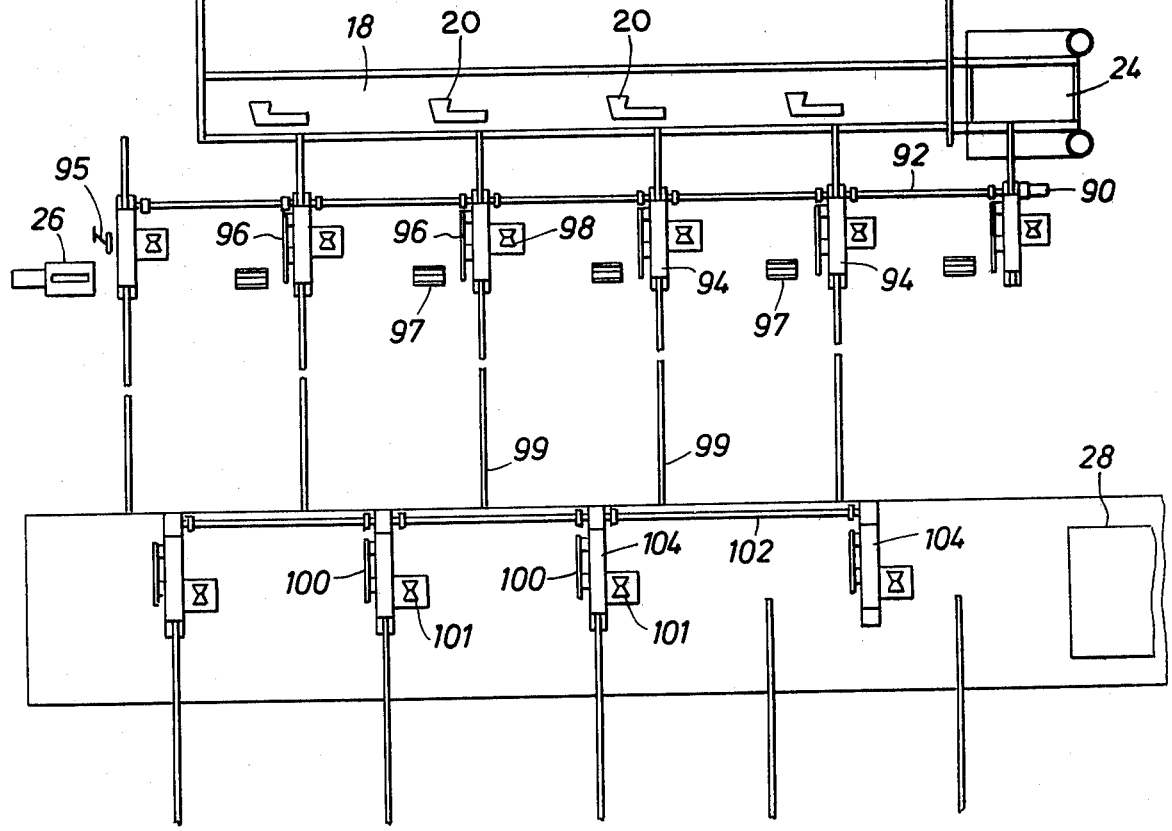
FIG.1

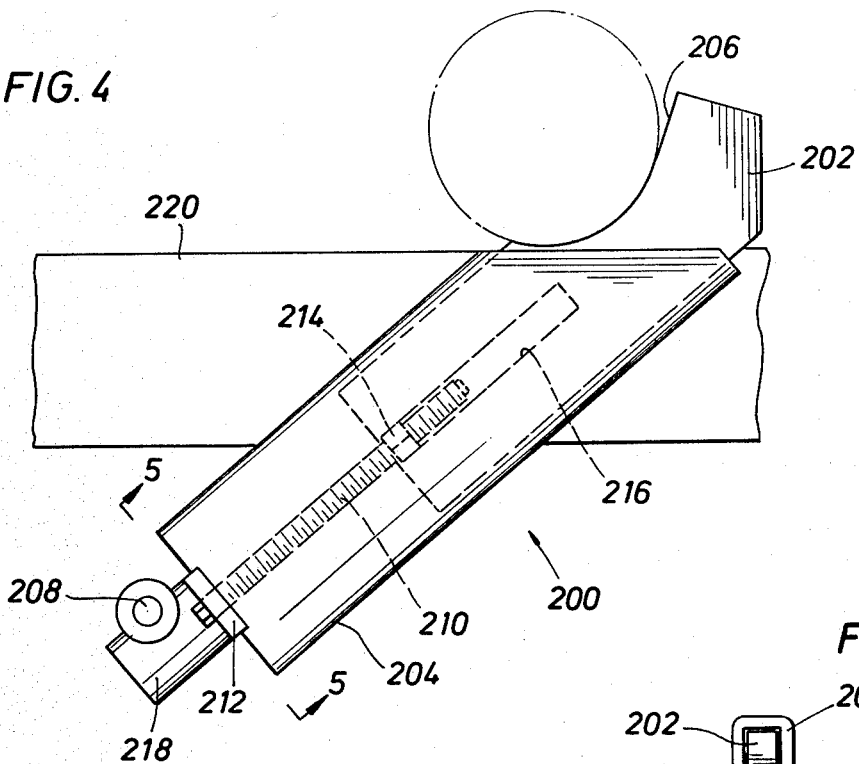
FIG. 4
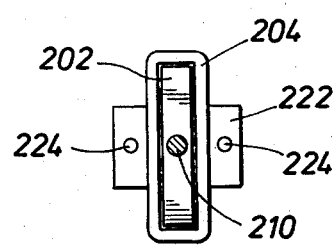
FIG. 5
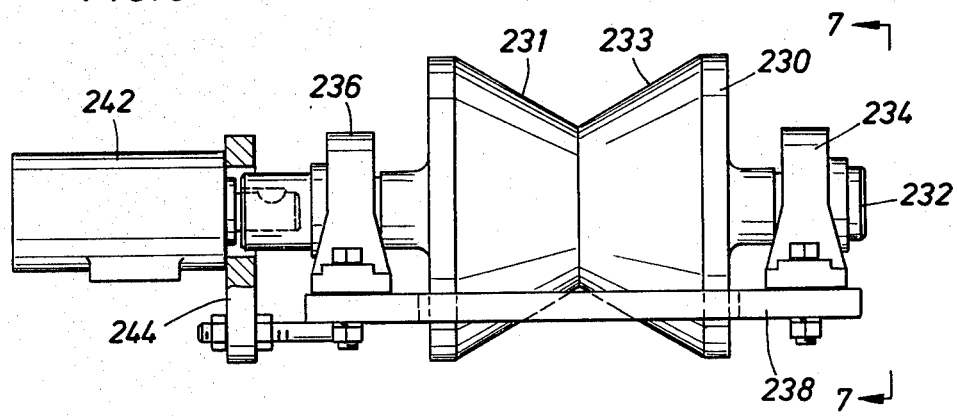
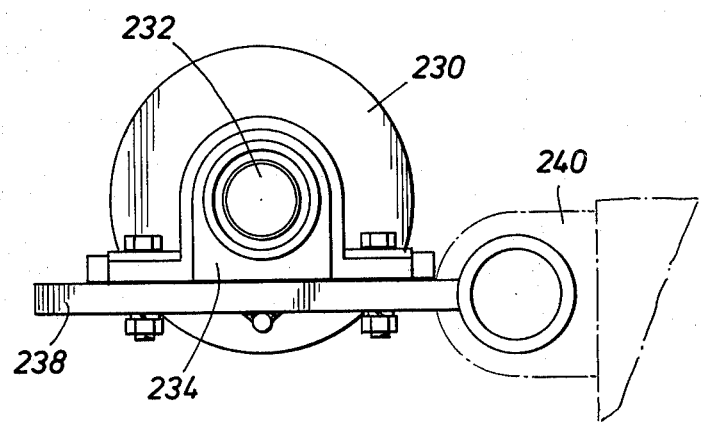
FIG. 6
FIG. 7

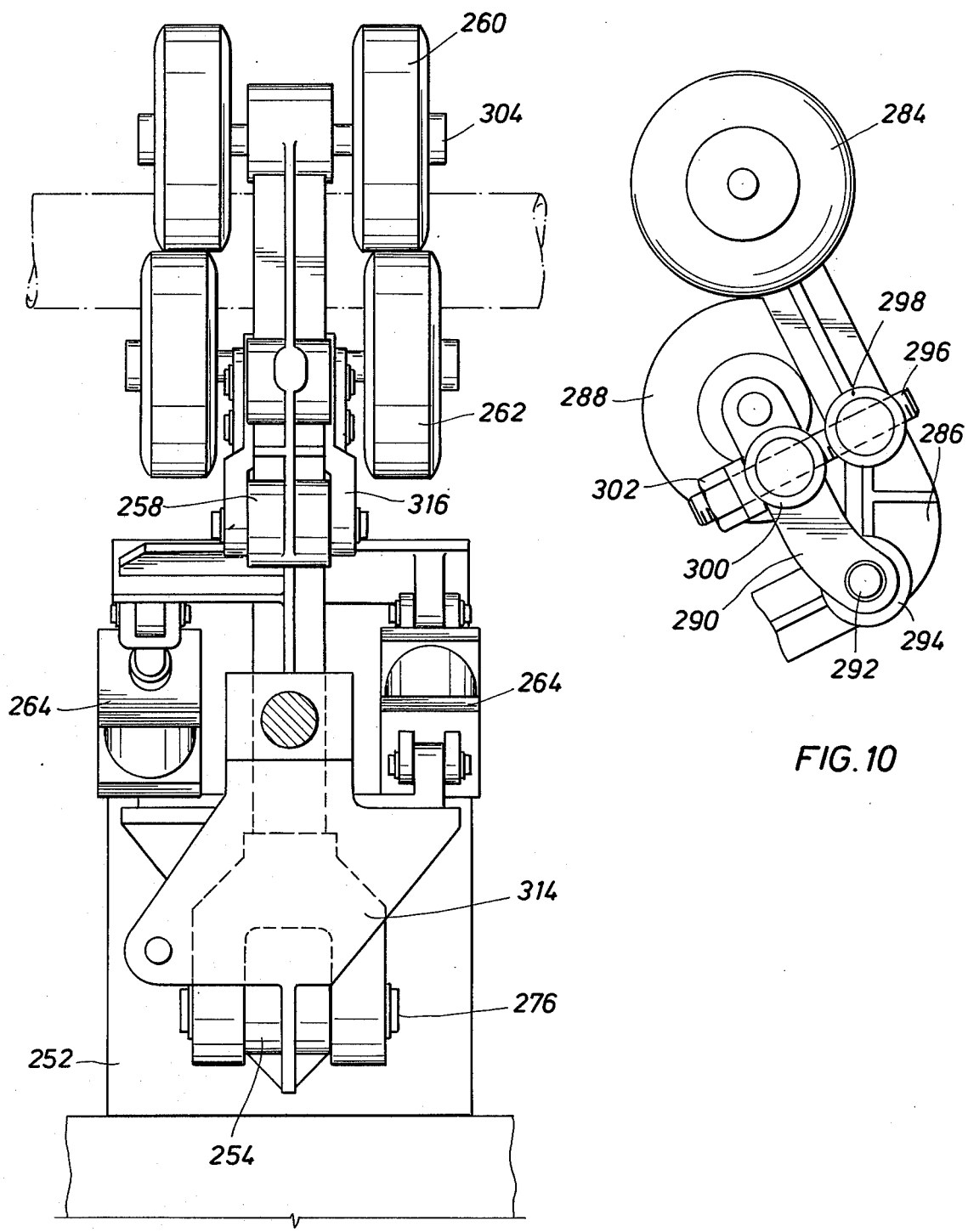

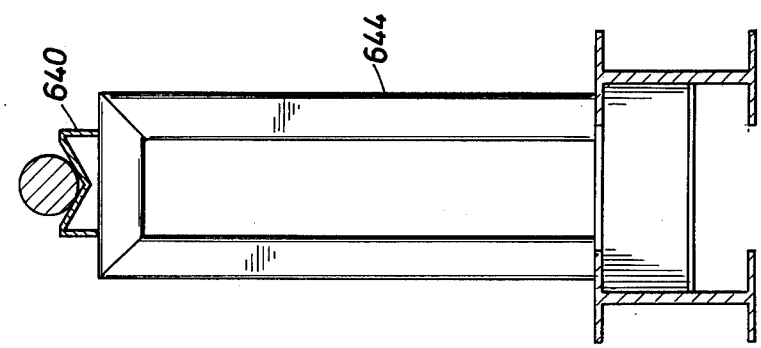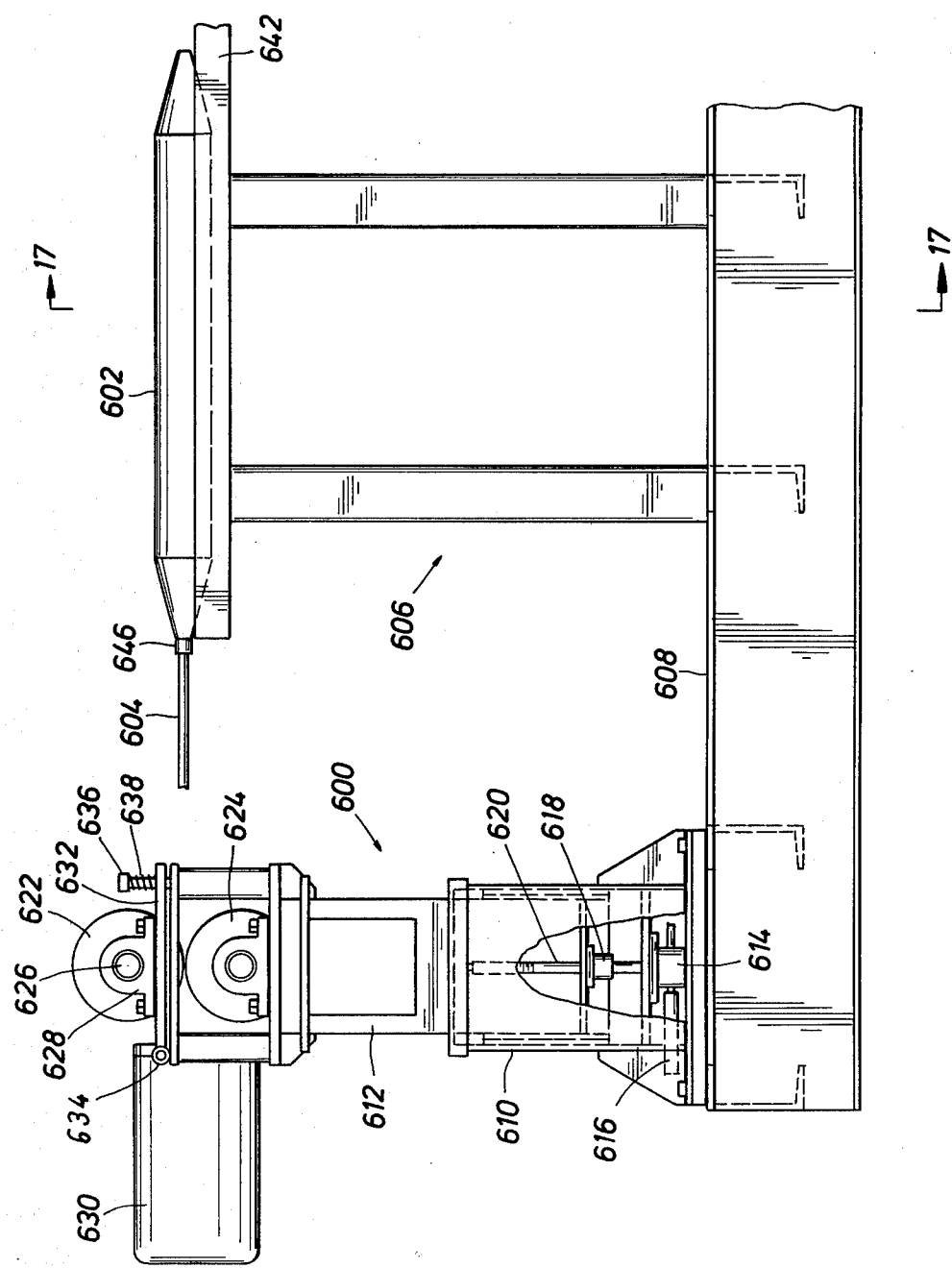

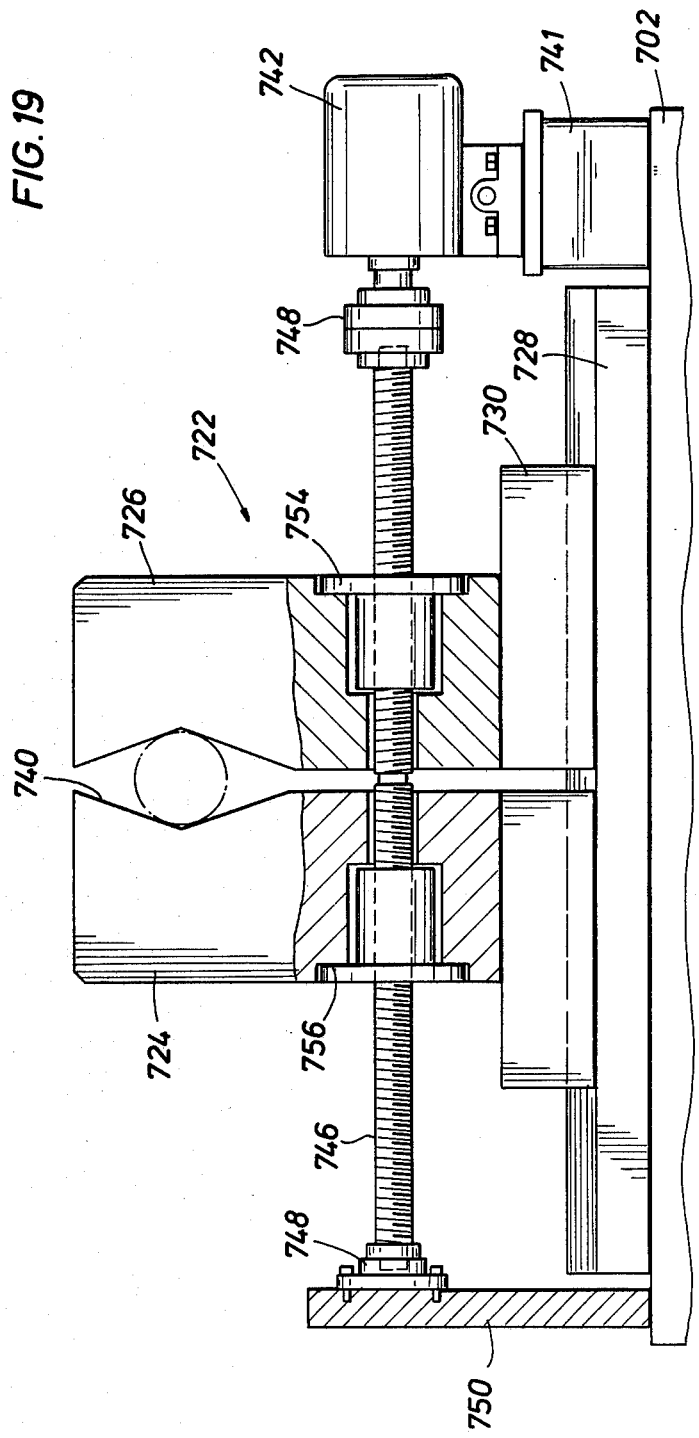

METHODS AND APPARATUS FOR THREADING A PIPE

BACKGROUND OF THE INVENTION

This invention relates to methods and apparatus for handling, threading, and testing joints of tubular products, and more particularly relates to improved systems, methods and apparatus for handling, threading, and testing links of pipe, tubing, and casing commonly employed in the petroleum production industry.

Joints of tubing, pipe, and casing having long been utilized in the petroleum producton industry for recovering petroleum substances from underground formations. The requirements for such products, and particularly for the threads, may be different from the requirements for threaded tubular products in general. For instance, casing and tubing used in the petroleum industry is often fabricated with a large, internally threaded box portion at one end of the pipe, and a specially designed pin portion thread on the other end of the pipe. Alternatively, pin portions may be formed on both ends of the pipe, and a seperate coupling may be threaded on one end to function in a manner similar to the box portion. After the box portion has been formed and the threads cut into the pipe, a oil well customer typically requires that the internal diameter of each joint of pipe be checked, and that the pipe be fluid tested at a predetermined pressure.

The equipment for threading and pressure testing pipe, including pipe handling equipment for transporting pipe to various pieces of equipment, has been commercially available and is utilized by those generally engaged in threading pipe for the petroleum industry. Conventional equipment, however, has several drawbacks which limit its productivity and acceptance within the pipe threading industry.

It may be desirable that pipe threading equipment be easily moved to new locations, although much of the prior art equipment is not suited for such purposes. The petroleum industry may prefer pipe threading facilities near the particular location where drilling operations are most active, and it is therefore advantageous that such equipment be adapted to be periodically moved. Typically, conventional pipe handling equipment does not position each segment of pipe at a common elevation line at the stage prior to the machining or testing operation. Since elevation lines vary with different equipment, various machining or testing equipment cannot be added or deleted from the overall assembly without altering the pipe handling equipment. This substantially decreases the flexibility desired to periodically adjust the threading line to meet changing needs.

Some of the prior art pipe handling equipment bent or damaged the pipe, or transported the pipe to one or more threading or testing machines in a manner that had a tendency to damage the machines. Other prior art handling equipment does not have the ability of supporting a rotating pipe, so that the threading operation necessarily has to be accomplished on a stationary string of pipe. Even the handling equipment which is able to support a rotating length of pipe frequently allows unwanted vibration in the rotating pipe, so that the threading operation cannot be performed at desired pipe rotation speeds. Vibration in the rotating pipe also contributes to a low quality threading operation, so that the pipe may be rejected after the threading operation.

As previously noted, it is common for those engaged in pipe threading operations to form an expanded box portion at one end of the pipe. This box portion may be produced by cold-forming an end portion of the pipe in a radially outward direction, thereafter reforming the tip portion inwardly to approximately its original state, and finally forming internal threads on the tip portion of the box. The box portion may also be formed by radially expanding an end portion of the pipe, and thereafter internally threading the expanded portion. A pin portion may be formed on the other end of the pipe (or on both ends if a coupling is utilized instead of a box portion) by inwardly contracting the end of the pipe.

Equipment typically used to form the expanded portion of the box and reform the tip portion inwardly suffers from drawbacks associated with (a) misalignment of the box with the axis of the pipe, (b) uneven deformation of the sidewalls of the box, and (c) misalignment of the expanded sidewalls of the box and the reformed tip of the box. Also, the power sources for such cold-forming and reforming operations are expensive and operate in a time consuming manner.

The prior art is also seriously burdened with problems associated with the fluid test station which may be included in the overall pipe threading line. Powered equipment for threadedly engaging the end of the pipe and injecting fluid into the pipe offers a substantial increase in productivity compared to manual techniques, but is also capable of galling or otherwise damaging the threads of the pipe, thereby substantially destroying the value of the threaded pipe. Misalignment of the head of the test equipment and the threaded end of the pipe may result in damaged pipe, damaged test equipment, and down-time for the overall threading assembly.

Accordingly, there is a need for a pipe threading system, method, and apparatus which will perform the various operations associated with threading pipe in an efficient manner. Preferably, such a system will not only be capable of threading joints of pipe, but may also have the capability of forming box ends and pin ends on drill pipe, coating ends of pipe with a protective fluid, checking the internal diameter and straightness of the threaded pipe, fluid pressure testing the pipe, and handling the pipe in a safe and efficient manner with the various machines performing these or similar operations. Further, it is desirable that such a system be capable of threading and checking pipe at a rapid rate, and performing such operations with a minimum number of personnel.

The disadvantages of the prior art are overcome with the present invention. Novel methods and apparatus are hereinafter provided for threading, testing, and handling tubing, casing, and pipe utilized in the petroleum industry.

SUMMARY OF THE INVENTION

In an exemplary embodiment of the present invention, an overall pipe threading system is provided which comprises one or more forming machines, threading machines, dip tanks, internal pipe diameter inspection stations, fluid pressure test stations, and pipe handling equipment for transporting the pipe to the machines performing these various operations.

Each of these machines may be mounted on structurally independent modules which are removable from the overall assembly. The pipe handling equipment for the system is capable of positioning each joint of pipe at a common elevation prior to each machining or testing operation, so that various modules may be added or deleted from the overall assembly without adversely affecting prior or subsequent pipe handling operations. The machines comprising the overall pipe threading system can therefore be removed and reinserted at other locations by merely disconnecting the power supply lines to the modules and moving individual modules to the selected location.

The pipe handling system according to one embodiment of the present invention comprises a plurality of beams or rails to support lengths of pipe, plates powered through an arcuate path to lift and position each segment of pipe, powered V-rollers for moving a segment of pipe into position for the forming machines, a powered cart for subsequently bringing the pipe into position for the threading machines, "steady rest" assemblies for supporting a joint of pipe being rotated for the threading operation, and a pipe tipping mechanism for dipping one end or both ends of the pipe into a protective bath. The pipe handling system is capable of automatically handling and properly positioning pipe of varying length and diameter, with a minimal amount of adjustment to the system.

The present invention may utilize an upset or cold-forming press to form a box end on the pipe. To form one type of box end, two hydraulic cylinders pull an upper platen vertically downward toward the lower stationary platen, thereby securing the pipe in a stationary position axially aligned with the movement of the upset heads. A third hydraulic cylinder forces a first head or mandrel into engagement with the end of the pipe, and cold-forms the end of the pipe radially outward. Thereafter, a pivotable second head is positioned over the mandrel, and the same hydraulic cylinder forces the second head against the end of the pipe to contract the end of the expanded box formed by the mandrel. Other types of box ends and various types of tip ends may be formed on the ends of pipe in similar fashion, and will subsequently be described in greater detail.

A power-operated drift station may be employed to push a tapered test plug through the pipe to ensure that a proper internal diameter and straightness has been maintained for the pipe. The diameter of the plug will depend on the size of the pipe, and the powered wheels of the drift station are vertically adjustable for maintaining proper axial alignment of the drift rod and the plug while the plug is being passed through the pipe.

The power-operated fluid pressure test stand of an exemplary embodiment of the present invention is particularly designed to alleviate misalignment between the fluid test head and the pipe. When the fluid pressure test operation is performed, the pipe is preferably slightly tilted from the horizontal plane, and the body of the test stand preferably slides on an adjustable platform to properly align the head of the fluid test unit with the axis of the pipe. Additionally, the body of the test stand is mounted on a plurality of springs, so that any slight misalignment problems may be alleviated by allowing limited movement of the body of the test stand.

It is a feature of the present invention to provide an improved system, method and apparatus for threading and testing pipe, and for handling and positioning the pipe between various machines utilized to properly thread and test the pipe.

It is another feature of this invention to provide equipment to handle, thread and test pipe which may be efficiently operated with the minimum number of personnel.

Another feature of the present invention is to provide equipment for handling, threading and/or testing pipe which alleviates axial alignment problems between such equipment and the pipe.

Still another feature of this invention is to provide equipment for assisting pipe threading operations capable of operating at the maximum production rate of the threading machine and which does not damage or otherwise detract from the value of the pipe.

These and other features and advantages of the present invention will become apparent in the following detailed description, wherein reference is made to the figures in the encompanying drawings.

DRAWINGS

FIG. 1 is a simplified plan representation of one embodiment of the overall threading line equipment according to the present invention.

FIG. 4 is a side elevation of another embodiment of the pipe stop mechanism generally depicted in FIG. 2.

FIG. 5 is a cross-sectional view of the stop mechanism shown in FIG. 4.

FIG. 6 is a simplified side view of a typical powered V-roller for the pipe handling system generally shown in FIG. 1.

FIG. 7 is an end view of the V-roller depicted in FIG. 6.

FIG. 9 is a side view, partially in cross section, of the steady rest assembly shown in FIG. 8.

FIG. 10 is a side elevation of an alternate embodiment of the tire adjustment mechanism for the steady rest previously depicted in FIG. 8.

FIG. 16 is a side view, partially in cross section, of the drift station generally shown in FIG. 1.

FIG. 17 is a cross sectional view of the pipe stand assembly generally shown in FIG. 16.

FIG. 19 is an end view, partially in cross section, of a portion of the apparatus shown in FIG. 18.

DETAILED DESCRIPTION

Figure 3:
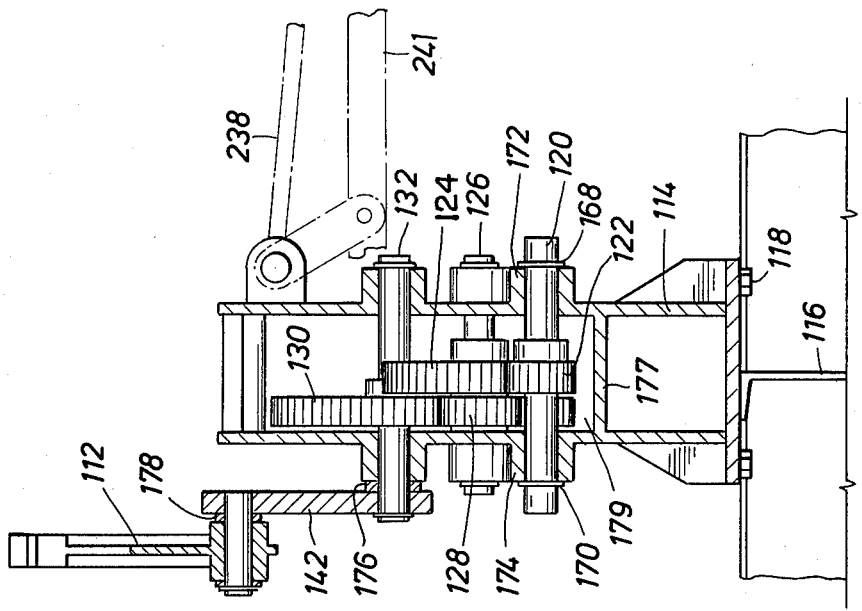
FIG. 3 is a cross-sectional elevation of the apparatus depicted in FIG. 2.

FIG. 1 is a simplified plan view of one embodiment of the present invention, and represents generally an overall pipe threading line. The overall pipe threading line consists of an elaborate pipe handling system and one or more forming, threading, coating, and testing operations. The pipe handling system physically positions each piece or joint of pipe for each of these operations, and transfers the pipe to the subsequent operations. The top of FIG. 1 may be represented as the north end of the overall threading line, and corresponding directional notations will be used for locational purposes.

Joints of unthreaded pipe may be stored in a pipe rack (not depicted) and fed into the pipe handling system from the north end of the overall threading line in a conventional manner, e.g. an overhead hoist or hydraulically powered platform may "dump" a plurality of links of pipe onto the pipe handling system as required. In the overall threading line depicted in FIG. 1, the handling system positions a single joint of pipe for the upset or forming operation performed by the press 12 on the west end of the pipe. As will be subsequently explained in detail, the press 12 may expand the end of the pipe to form the "box" portion for tubing or casing, or may form the pin portion of the tubing or casing in preparation for the threading operation. In addition, the press 12 may also contain conventional induction heading equipment to alleviate stress within the end of the pipe after the cold-forming operation. After the west end of the pipe had been formed by the press 12, the pipe handling system may position the pipe so that the east end may similarly be cold-formed by another press (not depicted) on the east end of the pipe handling system.

After the cold-forming operation has been accomplished on both ends of the pipe, the pipe handling system in FIG. 1 indexes to transport the pipe to the threading machine 14 for threading the west end of the pipe. Thereafter, the pipe is positioned so that the east end of the pipe may be similarly threaded by the threading machine 16.

After both ends of the pipe have been formed and threaded, it may be desirable to treat one or both ends of the pipe to inhibit corrosion of the threads and prevent galling between mating threads of joints of pipe. The pipe may be transported to a tipping mechanism 18 which tilts the pipe so that an end of the pipe may be immersed in a protective bath. In FIG. 1, the hydraulically powered tipping mechanism 18 has a plurality of arms 20 which support the pipe. The arms 20 may be raised so that the pipe is tilted eastwardly downward and the east end of the pipe is immersed in a dip tank 24 containing a phosphate base solution. The west end of the pipe may be similarly treated, although if a previously treated pipe coupling is threaded on the west end of the pipe, it is generally not necessary to also dip that end of the pipe. If desired, the coupling may be threaded to the pipe by a power tong (not depicted) located in the west side of the pipe threading line.

Many pipe handling systems have a tendency to dent or otherwise damage the pipe. In the petroleum industry, a customer generally demands that the pipe be checked to ensure that it has not been damaged during the forming or threading operations. To ensure that the internal diameter of the pipe remains within an acceptable range throughout the length of the pipe, the pipe handling system subsequently positions the pipe for an internal diameter check accomplished by the drift station 26. The drift station 26 passes a tapered die through the pipe in order to detect whether the internal diameter of the pipe has been reduced by bending or otherwise damaging the pipe.

It is also desirable to ensure that the threads of the pipe have been properly cut so that the joints of pipe will not leak when fluid subsequently flows through the pipe under pressure. The pipe handling system therefore positions the pipe for another test operation performed by the fluid test unit 28. As subsequently explained in detail, the fluid test unit fills the pipe with a suitable fluid and maintains fluid pressure for a period of time within a desired pressure range.

After the fluid pressure test, the overall pipe threading operation is complete and pipe may be transferred by the pipe handling system to a finished pipe rack (not depicted) located at the south end of the line. If desired, conventional thread protectors may be added to the stored pipe to protect the threads until the pipe is used.

The press 12, the drift station 26, and the fluid test unit 28 will be discussed in greater detail below. For the present, however, it is to be understood that the pipe threading line may employ one or more of each of the machines described above, but also need not employ each of these machines. For instance, the dip tank 24 may not be required, or additional inspection stations may be installed in the pipe threading system. Further, one or more pipe reject stations may be located within the overall pipe threading line. For instance, if a length of pipe is rejected at the I.D. drift check, the pipe may not pass through the fluid pressure test, but may be "dumped" from the pipe handling system.

It is to be understood that the overall pipe threading line as depicted in FIG. 1 simultaneously handles many lengths of pipe. At the same instant, a joint of pipe may be within the press operation, while another joint is being threaded, the end of a third joint is being phosphate treated, a fourth joint I.D. checked by the drift station, and a fifth fluid pressure tested. Prior to each of these operations, a plurality of joints may be "waiting" within the pipe handling system on rails, an individual joints of pipe will subsequently be picked up by a plurality of plates and positioned for the operation. Also, the cycle time of each of the machines may be such that an overall pipe threading line may contain two presses for cold-forming each end of the pipe, four threading machines (so that each machine only threads one end of alternate pieces of pipe), and two fluid pressure test units. Since the pieces of equipment are mounted on independent modules, the desired production from an overall pipe threading line may be easily and efficiently achieved by adding or substracting additional machines as required.

Referring now to the pipe handling system depicted in FIG. 1, it is understood that a plurality of unthreaded pipe lengths may be dumped onto and supported by a plurality of substantially horizontal beams or rails 30. In FIG. 1, each of the rails are sloped slightly, so that successive joints of pipe may roll southward along the rails until engagement with a stop.

A plurality of vertical plates 32 are driven in synchronization through an arcuate path for picking up a section of pipe from the rails. A motor 34 drives a common drive shaft 36 to power a plurality of gear boxes 38, which rotate respective plates 32. If desired, a speed reducer 40 may be utilized between the motor 34 and the drive shaft 36, but it is a feature of this invention that a common drive shaft be driven directly by motor 34, thus eliminating the cost of a speed reducer. Drive shaft 36 may include one or more couplings 42, for ease of assembly. The length of the shaft 36 and the number of gear boxes 38 will depend on the maximum length and weight of the pipe to be handled. A shaft of approximately forty feet may drive from three to seven gear boxes, and thereby provide adequate support for the pipe when lifted by respective plates 32.

The plates 32 pick up the joint of pipe from the rails at a predetermined elevation, and position the pipe on a plurality of powered V-rollers 44 which pre-position the pipe. As hereinafter described, at the same time the plates 32 also transfer another length of pipe from the V-rollers 44 to V-rollers 46. A third length of pipe is simultaneously picked up from the V-rollers 46 and placed on the rails 48, which are similarly tilted to roll the pipe to the next operation. Thus, the motor 34 energizes to simultaneously drive a plurality of plates 32, which pick up three joints of pipe and transfer each joint to the next stage.

Since pipes vary in length and are not always dumped on the rails 30 in the same position, powered V-rollers 44 drive the pipe westwardly until the west end of the pipe engages a stop 45 near the motor 34. Thus, powered V-rollers 44 pre-position the west end of the pipe so that successive lengths of pipe are placed at a predetermined position.

When the pipe is transferred to the next stage, powered V-rollers 46 drive the pipe into position to be clamped by the press 12. One advantage of two sets of V-rollers 44 and 46 is that one joint of pipe can be moved a substantial distance westwardly by rollers 44 while press 12 is forming another joint of pipe.

Plates 32 preferably deposit the pipe on rails 48 at the higher elevation than when the pipe was picked up from the rails 30 by plates 32. The pipe may therefore roll southwardly on rails 48 and may be picked up by the next plurality of plates at the same elevation at which the pipe was picked up by plates 32. In this manner, the pipe handling apparatus positions the pipe at a constant elevation for the various equipment. This feature therefore allows different pieces of equipment to be added or eliminated from the overall system without adversely affecting other equipment or the pipe handling system.

The pipe handling system may thereafter position the east end of a pipe within a press (not depicted) on the east side of the line. This operation may simply be the reverse of that previously described. Another drive motor may be located on the east side of the line for powering a plurality of plates, and two sets of V-rollers may similarly position the pipe eastwardly for the press.

For the third operation, a plurality of plates 50 pick up pipe from rails 52 and position a joint of pipe on powered pre-positioning V-rollers 54, thereafter on non-powered V-rollers 56, and finally on sloped rails 68. The plates 50 are similarly powered by a drive motor 51 on the east end of the line, the driving force being transmitted by a shaft 58 and through respective gear boxes 60. Powered V-rollers 54 support and transfer the pipe toward the east side of the line and V-rollers 56 support the pipe while cart 62 transports the east end of the pipe to the threading machine 14. Although cart 62 will be discussed in detail below, it is to be understood that cart 62 clamps the pipe and rides on cart platform 64 to carry the pipe to the threading machine, while rollers 56 merely support the pipe during this operation.

Since the cart platform 64 is located below the pipe when positioned on V-rollers 56, there is a large spacing between the two plates 50 nearest the threading machine 14. When the pipe is being indexed from the rails 52 to the V-rollers 54, the pipe may be further supported by plate 50A powered through gearbox 61. The plate 50A prevents a long portion of pipe from being cantilevered from the plate 50 immediately east of the cart 62. The plate 50A may only support the pipe during this operation, since the plate 50 nearest the threading machine 14 will support the pipe once it is pre-positioned on rollers 54.

The actual threading operation is accomplished by threading machine 14, which is also adapted to grasp and rotate the pipe at a high speed during the threading operation. A plurality of steady rest assemblies 66 adjacent the V-rollers 56 support the pipe while being rotated by the threading machine 14. The steady rest assemblies 66 preferably do not transmit vibration to the threading machine or other equipment, but rather effectively function to damper any vibration of the rotating pipe. In order to cut high quality threads, it is important that vibration of the pipe during this operation be minimal, and steady rest assemblies 66 are particularly adapted for supporting a rotating pipe while allowing a minimal amount of vibration. Prior to the threading operation, hydraulic or air cylinder 67 may be activated to lower V-rollers 56 by means of a conventional linkage mechanism.

After the west end of the pipe is threaded, the pipe is transported to similar apparatus for threading the east end of the pipe with threading machine 16. The pipe handling equipment, including shaft 78, plates 68, gear boxes 70, steady rest assemblies 72, V-rollers 74 and 76, and cart 88 function in the manner previously described for the operation performed by threading machine 14.

Because of a particular arrangement desired, it may be advantageous that the shafts connected to the gear boxes be located on the north side of their respective carts and steady rest assemblies, and that the plates be located on the machine side of the gear boxes. As shown in FIG. 1, the shafts 58 and 78 are located on the north side of their respective carts and steady rest assemblies, but the plates 50 are on the west side of gear boxes 60 while the plates 68 are on the east side of gear boxes 70. It is a feature of this invention that gear boxes be interchangable with a minimum amount of effort. It is therefore a feature of the invention that gear boxes 60 and 70 be adapted so that they can be driven from a shaft on either side of the gear box.

After both ends of the pipe have been threaded, the pipe handling system may index the pipe to the dip tank 24, and thereafter to the drift station 26. Motor 90, shaft 92, gear boxes 94, and rotating plates 96 may be provided to position the pipe on the powered prepositioning V-rollers 98 prior to the drift operation. The powered V-rollers 98 may drive the pipe against a stop 95 on the west side of the line. Alternatively, a "buck-on" apparatus or power tong may be used instead of stop 95. The power tong may be provided with a stop to limit westward movement of a joint of pipe, and may also be utilized to thread a coupling to the end of the pipe. The plates 96 may then transfer the pipe to a plurality of V-shaped supports 97, which support the pipe during the drift operation.

As previously mentioned, it may be desirable to dip or coat both ends of the pipe. If the west end of the pipe is to be dipped, the pipe may subsequently be transferred to another dip tank (not depicted) on the west side of the pipe threading line. After leaving the drift station 26, the pipe may be properly positioned in the east-west direction for this additional dip operation. In any event, the pipe may subsequently be transferred by the pipe handling equipment, and may roll southwardly along rails 99 to the fluid test operation.

At that time, the pipe may be positioned by a plurality of plates 100 powered through shaft 102 and respective gear boxes 104 for the fluid test operation. The plates 100 may position the pipe on powered prepositioning V-rollers 101 which transport the pipe into the test unit 28. Alternately, the pipe may be properly positioned in the east-west position after leaving the drift station 26, and the pipe may then be positioned by plates 100 on a plurality of stationary V-shaped supports. The fluid test operation is performed by the fluid test unit 28, and will be subsequently described in detail. Each of the above components of pipe handling apparatus operate in the manner of similar components previously described.

Figure 2:
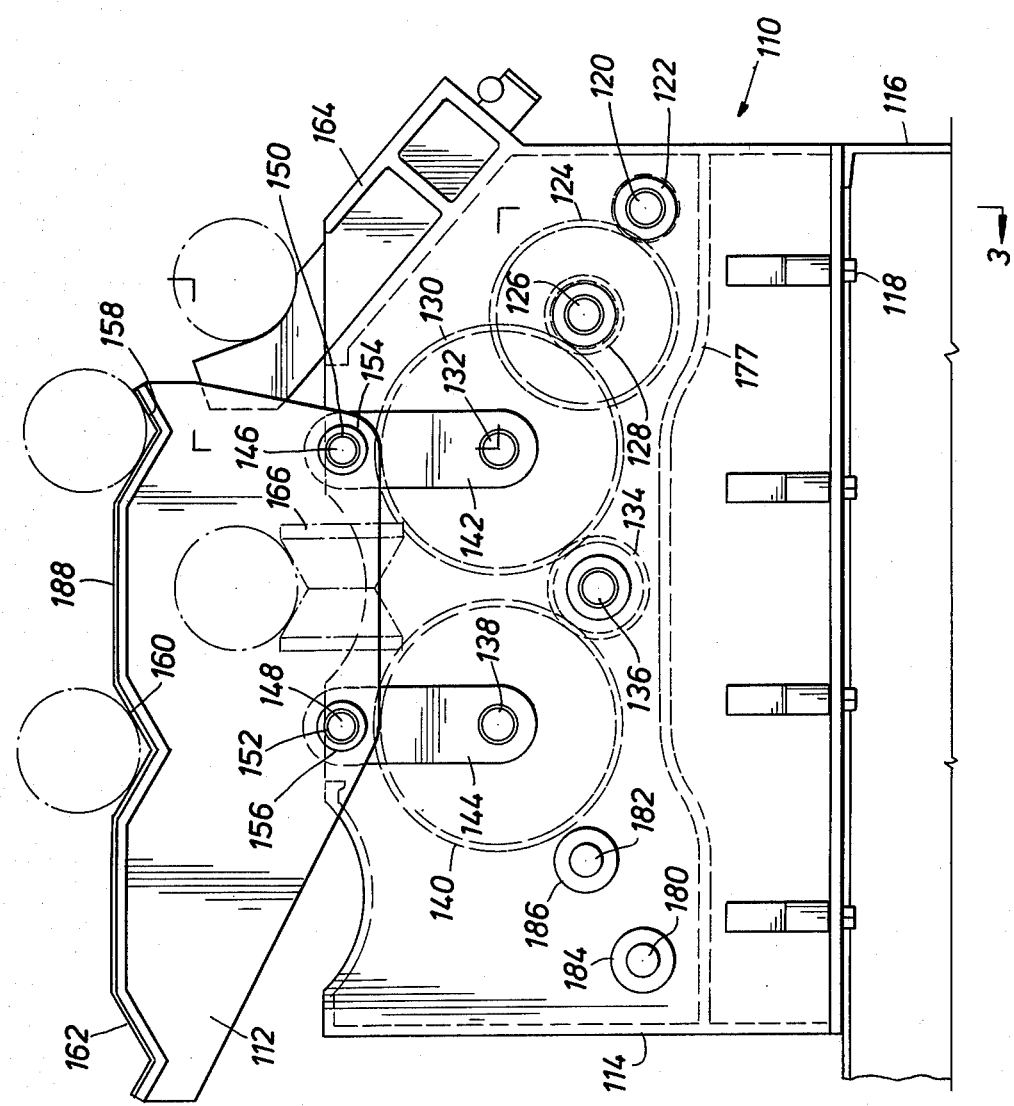
FIG. 2 is a simplified side elevation of a portion of the drive mechanism for the pipe handling system generally depicted in FIG. 1.

Various components of the pipe handling system generally depicted in FIG. 1 will hereinafter be described in greater detail. FIG. 2 depicts a gear box 110 and plate 112 which may correspond to the gear box 38 and plate 32, the gear box 60 and plate 50, the gear box 70 and plate 68, the gear box 94 and plate 96, or the gear box 104 and plate 100, all depicted in FIG. 1. The housing 114 of the gear box may be cast and secured to a structural platform or modular base 116 by a plurality of bolts 118. Preferably, the rails 30 and 48 are both bolted to the ends of the gear box, so that the pipe handling apparatus may be more easily assembled and disassembled.

Shaft 120 may correspond to shaft 36, 58, 78, 92 or 102 depicted in FIG. 1, and spur gear 122 keyed to the common shaft drives spur gear 124 which rotates about shaft 126. Also secured to shaft 126 is gear 128, which drives gear 130 about shaft 132. Gear 130, in turn, drives gear 134 about shaft 136, which drives gear 140 about shaft 138 in synchronization with gear 130. Arms 142 and 144 are keyed at one end to shafts 132 and 138, respectively, and at the other end to stub shafts 146 and 148, respectively. The shafts 146 and 148 protrude through apertures 150 and 152 in plate 112, and retaining rings 152 and 154 secure the plate to the shafts while allowing rotation movement therebetween.

The plate 112 is shown to contain three notches 158, 160, and 162 for simultaneously supporting different sections of pipe. A stop assembly 164 is mounted within the housing 114 for detaining sections of pipe on the rails (not depicted). A V-roller 166 shown in phantom between gears 130 and 140 is not part of the gear box 110, but is depicted to show the location of V-rollers 44, 54, 74, 98 and 101 with respect to their respective gear boxes.

It may now be understood that during a single rotation of plate 112, notch 162 assists in transferring a section of pipe from V-rollers 46 to rails 48, while notch 160 transfers a section of pipe from V-rollers 44 (corresponding to V-rollers 166 depicted in FIG. 2) to V-rollers 46, while notch 158 picks up a section of pipe from adjacent the stop assemblies 164 and deposits the pipe on the V-rollers 44. Similar operations may be performed by the other plates depicted in FIG. 1, which are similarly powered. For each operation, a plurality of gear boxes are driven by a common shaft 120, so that a plurality of plates simultaneously rotate to transfer three sections of pipe to a subsequent stage in the operation.

FIG. 3 is a cross sectional elevation of a portion of the apparatus depicted in FIG. 2. The shaft 120 is retained by retaining rings 168 and 170 adjacent bosses 172 and 174 of the housing 114. Although shaft 120 may extend through several gear boxes, it is preferable to couple various segments of shaft 120 by couplings 42 depicted in FIG. 1. Each of the shafts 126, 132, 136, and 138 are similarly mounted to the housing 114, held in place by retaining rings adjacent respective bosses. Since the bosses are cast as part of the housing 114, low frictional forces are generated between the outer diameter of the steel shafts and the inner diameter of the cast bosses. No bearing may therefore be required to rotatably mount the shafts to the housing 114. A bronze washer 176 between the cast boss and the arm 142 likewise reduces friction and wear between these components, and a similar washer 178 is positioned between the arm 142 and the plate 112.

The housing 114 includes a lower shelf 177, so that the various gears may be positioned in a fluidtight chamber 179. Chamber 179 may be filled with oil or other suitable lubricant to reduce wear on the gear teeth. The oil bath is preferably in contact with all the gears, although it may be seen from FIG. 2 that the oil level need not rise much higher than the lower portion of gears 130 and 140.

It is a feature of this invention to drive a plurality of gear boxes and respective plates from a common shaft positioned through one end of the gear box rather than by a common shaft positioned between gears 130 and 140. Housing 114 may be constructed with eight apertures 180 and 182 on both sides and at both ends of the housing, to easily facilitate driving the plates from a common shaft on either side of the gear box 110. Since gears 130, 134, and 140 are symetrically positioned between the aperture 180 and the aperture occupied by shaft 120, it may be seen that it is only necessary to re-position shafts 120 and 126 and their corresponding gears if it is intended to drive the gear box from a common shaft at the other end of the gear box. The gear boxes are therefore interchangeable with gear boxes driven from the opposite end, simply by moving these two shafts and their respective gears. Using this technique, the pipe handling apparatus has the desired flexibility and benefits from uniformity of components. To seal the oil within chamber 179, sheet metal plugs 184 and 186 may be pressed into apertures 180 and 182.

The plate 112 may be provided with a thin insert strip 188 for engagement with the pipe. The insert strip may be easily replaced when worn, and the dimensions of the insert strip may be changed depending on the diameter of the pipe to be handled. The number of notches in the plate 112 determines the number of joints which may be simultaneously transferred in the given cycle. If pre-positioning of joints of pipe are not required, only two notches may be provided in the plate for simultaneously (a) picking up a joint of pipe held in place by a stop assembly and indexing that pipe to an operational position, and (b) picking up a completed joint of pipe from the operational position and indexing that pipe on the rails for transfer to the next operation.

It is understood that a plurality of plates rotate in unison to index a segment of pipe. It is therefore important that the plates rotate smoothly and in synchronization, and not in a jarring manner that might damage the pipe. Power for driving a plurality of plates to position a length of pipe may be supplied by a single hydraulic motor, such as hydraulic motor 34, with an output directly to the common shaft 36. Some of the prior art pipe handling drive systems utilize a chain drive between the drive motor and the rotating plates, which contributed to jerky rotational movement of plates. As may be seen from FIGS. 2 and 3, plate 112 is driven by the motor through a gearing system, rather than using any chain drives, in order to maintain smooth rotation for a plurality of plates and pipe supported thereby. The speed of the hydraulic motor 34 may be varied by controlling valving of the hydraulic fluid system. Also, rotation of the plates may be smoothly started and stopped by the hydraulic motor without the need for additional braking apparatus.

It is a feature of this invention to provide most, if not all, of a gear reduction between the drive motor and the plates within the gear box 110. For example, the drive motor 34 may rotate at speeds between 100 and 150 RPM, while the plates 112 may be driven through one revolution in approximately four seconds, or at approximately 15 RPM. The gearing within the gear box 110 is designed to achieve this necessary slowdown, rather than achieve all or a major portion of the gear reduction prior to transmitting power to the common shaft 36. A major benefit from this design is that the diameter of the common shaft 36 may be kept at a minimum. Shaft 36 rotates at a high RPM, but under a relatively small torque, while shafts 146 and 148 rotate at a lower RPM under a higher torque. Since the common shaft 36 is subjected to a relatively small torque, the diameter of the shaft may be kept at a minimum even though it rotates at a high RPM.

Referring now to FIGS. 1 and 2, the operation of this portion of the pipe handling system will now be described. When the press 12 has finished upsetting or forming a joint of pipe C, that length of pipe may be supported by V-rollers 46, joint B may be supported by V-rollers 44, and joint A may be held in place on the rails 30 by a plurality of stop assemblies 164. Hydraulic motor 34 may be activated, driving plates 112 through a single rotation commencing and terminating with each plate in a lower position. During this cycle, each of the joints of pipe is raised and transferred smoothly to the next phase of the operation. The finished joint of pipe is transferred to the rails 48, which slope southwardly allowing the pipe to roll to the next operation. The activation and deactivation of hydraulic motor 34 may be controlled in a conventional manner by appropriately positioned limit switches.

FIG. 4 depicts an alternate embodiment of the stop assembly generally shown in FIG. 2, and FIG. 5 is a cross section of the apparatus shown in FIG. 4. The assembly 200 not only stops a segment of pipe in proper position for the plates, but is easily adjustable to properly position pipe of various diameters. This is an important feature of the stop assembly, since the center of the pipe must be properly positioned for engagement with the intended notch in the plate.

The assembly 200 includes stop piece 202 slideable in a rectangular housing 204. The surface 206 of piece 202 is adapted for engagement with the pipe, and is tapered so that the axis of the stopped pipe will be at the desired position. Thus, by adjusting the piece 202 with respect to housing 204, the plates will pick up the pipe at the same position regardless of the diameter of the pipe.

A wrench may be used to rotate shaft 208, which causes rotation of threaded rod 210 through gearbox 218. Rod 210 is rotatably held in place by lower member 212, and is threadedly secured to piece 202 at nut portion 214. The threaded rod therefore moves within aperture 216 in piece 202 as the rod rotates, which adjusts the position of piece 202 with respect to housing 204. The desired position of piece 202 with respect to housing 204 may be predetermined for various diameters of pipe, and appropriate markings on the assembly may indicate when the stop has been properly adjusted for a specific pipe diameter. If desired, the plurality of stop assemblies 200 used to properly locate a joint of pipe may be simultaneously controlled by rotating a common shaft (not depicted) connected to each of the shafts 208 for the stop assemblies.

In FIG. 5, it may be seen that the piece 202 slides within the housing 204, which also acts as a guide for piece 202. The gearbox 218 may be mounted to housing 204 by extending ears 222 and bolts 224. In FIG. 4, it may be seen that a stop assembly 200 may be mounted to each of the rails 220. For instance, a stop assembly 200 may be mounted to each of the rails 52 at a location adjacent the gearboxes 60. In another embodiment generally shown in FIG. 2, the stop assembly 164 is mounted directly within the housing of the gearbox. In the latter case, the housing 204 is therefore replaced by a similar housing which is formed as part of the gearbox 110. In other respects, the stop assembly 164 may be similar to stop assembly 200.

FIGS. 6 and 7 depict a powered V-roller generally shown in FIG. 1, which may be employed to preposition and support the pipe in the manner previously described. The V-roller body 230 rotates about shaft 232, and may be composed of a metal casting coated with a half-inch layer of urethane to reduce noise. Alternatively, a solid urethane body may be molded on a knurled shaft 232, or a metal casting body may be employed if the V-roller is used adjacent a heating operation. Each of the tapered surfaces 231 and 233 may form an angle of between 20° and 40° from the axis of the shaft 232, and preferably have an angle approximately 30°. This angle allows the V-roller to accomodate pipe of various diameters, while providing sufficient engagement with the pipe to provide the necessary frictional force to move the pipe in an axial (east-west) direction.

The shaft 232 is mounted on bearing assemblies 234 and 236, which are bolted to a plate 238 pivotable about a stationary member 240. A hydraulic motor 242 is supported by a bracket assembly 244 and rotates drive shaft 232 for positioning the pipe at the desired location.

The V-roller body 230 may be raised or lowered in a pivotable manner to accomodate different diameters of pipe. If the pipe diameter to be held by the V-rollers increases, the body 230 may be lowered so as not to change the axis of the pipe from the previous location. This adjustment may be accomplished manually by any appropriate mechanism, such as by adjusting the arm 241 with respect to the plate 238, both depicted in phantom in FIG. 3. Alternatively, the V-roller adjustment for maintaining a constant axis for the supported pipe may be accomplished by operation of a pneumatic or hydraulic cylinder connected to arm 241.

All the V-rollers may not be powered, and therefor need not have drive motors, but only a sufficient number to properly position the pipe in the axial direction. Also, some of the V-rollers, such as rollers 56 and 76 shown in FIG. 1, are intended only to support the pipe and do not position the pipe. If the V-rollers are raised or lowered for receiving each segment of pipe, as will be hereinafter described, hydraulic or pneumatic power means may be utilized to position the V-rollers.

Figure 8:
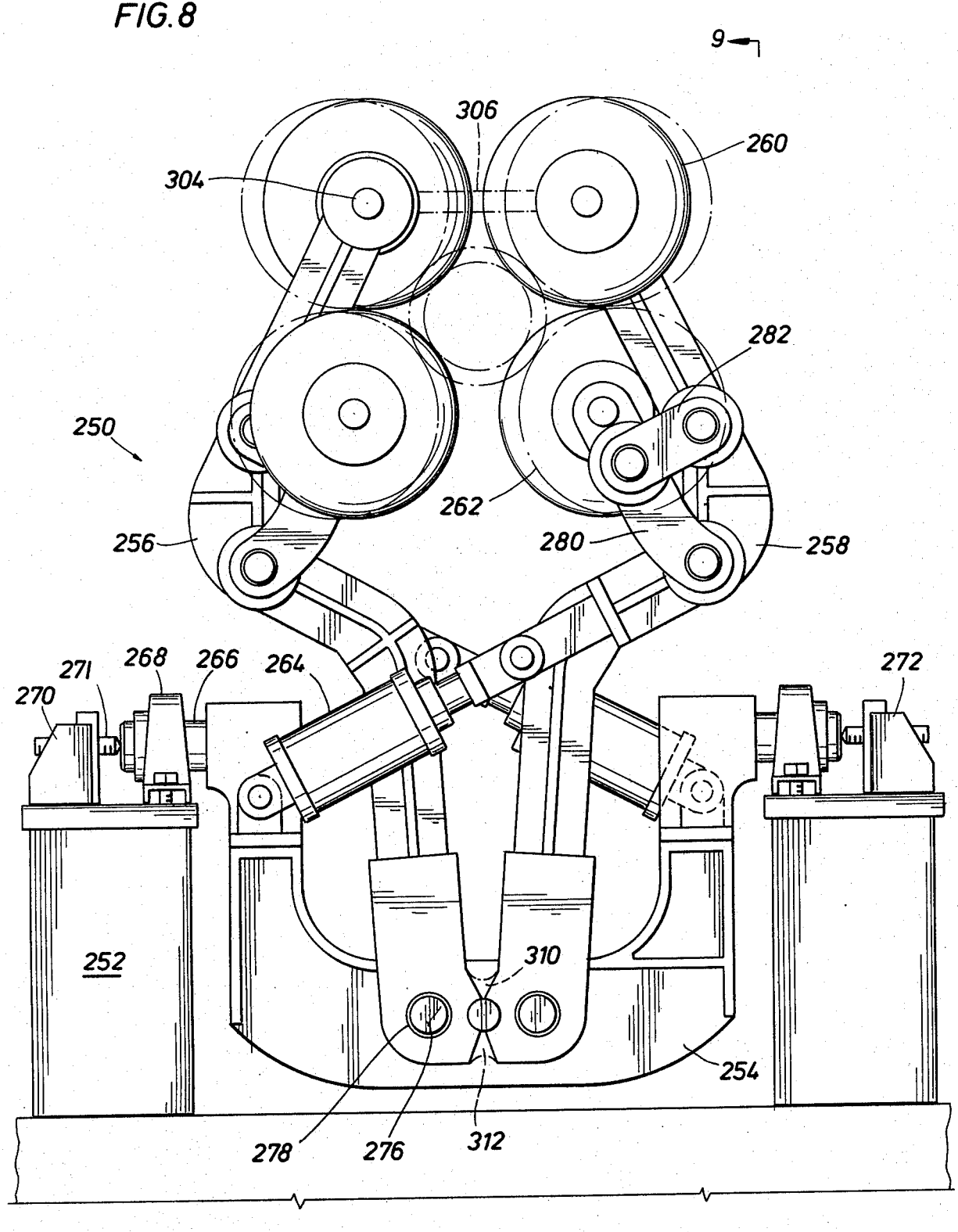
FIG. 8 is a simplified side elevation of a typical steady rest assembly for the pipe handling system generally shown in FIG. 1.

Referring now to FIGS. 1, 8 and 9, the pipe is supported by steady rest assemblies 66 while the pipe is being rotated and threaded by threading machine 14. Similarly, steady rest assemblies 72 support the pipe while the east end is being threaded by machine 16. These steady rest assemblies are designed to support a rotating pipe without transmitting vibration to the threading machine 14 or other equipment, and rather function to damper or absorb and reduce any vibration of the rotating pipe. Threading machines are now capable of cutting high quality threads at speeds approximately 500 Surface Feet Per Minute (SFPM), and threading machines may soon be capable of cutting threads at 750 SFPM if pipe handling apparatus could support the pipe without allowing excessive vibrational movement. The steady rest assemblies of the present invention are particularly adapted for supporting a rotating pipe at these high speeds without allowing excessive vibration.

A typical steady rest assembly 250 is depicted in FIG. 8, and FIG. 9 is a cross-sectional view of the same apparatus. Steady rest assembly 250 is mounted on a fixed platform or module including two upward extending supports 252. The steady rest assembly comprises a pivotable cradle 254, two pivotable arms 256 and 258, a pair of upper tires 260, a pair of lower tires 262, and two cylinders 264 each pivotably mounted between the cradle 254 and one of the arms 256 and 258.

Stub shafts 266 affixed to the upper portion of the cradle 254 extend through respective bearings 268 mounted on the supports 252. The steady rest assembly, including the cradle, arms, cylinders and wheels, is thus free to rotate about the axis of the shafts 266. Two adjustment blocks 270 and 272 are also mounted on supports 252 and each include a threaded rod 271 adapted for engagement with the end of one of the shafts 266. These threaded rods 271 may be rotated to move the steady rest assembly 250 toward one of the supports 252, and therefor enable each of the steady rest assemblies depicted in FIG. 1 to be moved northwardly or southwardly to properly align the threading machines and the steady rest assemblies supporting the pipe.

Each of the arms 256 and 258 is pivotable about a respective shaft 276 secured by a pair of retaining rings 278. Two air cylinders 264 may be employed to rotate the arms about their respective shafts, and thus open and close the tires about a pipe. Each of the upper tires 260 is fixed with respect to its respective arm, while each of the lower tires 262 may either be fixed or adjustable with respect to its arm. In FIG. 8, each of the tires 262 is mounted on clevis member 280, which is held stationary with respect to arm 258 by link member 282.

FIG. 10 depicts an embodiment in which the upper tire 284 is mounted on arm 286, and the lower tire 288 is mounted on clevis member 290. Clevis member 290 pivots about shaft 292 which rotates in an aperture protruding through boss 294 of arm 286. A threaded rod 296 extends through an aperture provided in boss 298 of arm 286 and through boss 300 of clevis member 290. The rod 296 may be threadably connected to boss 298 by clockwise threads, and to boss 300 by counter-clockwise threads. Thus rotation of the rod 296 by a suitable tool causes a pivoting action of clevis member 290 and adjusts the position of lower tire 288 with respect to the arm 286. If desired, a lock nut 302 may be provided at one end or at both ends or rod 296 to prevent unintentional rotation of rod 296. It may be understood that a lower tire 262 may be easily rendered adjustable with respect to arm 258 by replacing link member 282 with a threaded rod apparatus depicted in FIG. 10.

It is a feature of this invention to provide for adjustment of the lower tires with respect to the arms and the upper tires. Referring to FIG. 8, if the steady rest assembly is supporting a pipe having a two and three-eighths inch diameter, the lower tires 262 may be adjusted so that they are directly below or slightly outwardly from the upper tires 260. On the other hand, if the assembly is supporting a seven and five-eighths inch diameter pipe, the lower tires 262 may be adjusted to be positioned slightly closer than the upper tires 260. The position of the lower tires 262 with respect to the upper tires 260 affects the points at which the tires contact the rotating pipe. Adjustment of lower tires 262 enables contact points to be changed so as to reduce vibrational forces being transmitted by the rotating pipe.

Referring again to FIGS. 8 and 9, it may be understood that when the pipe is rotated by the threading machine, each of the tires is rotated about its respective shaft 304 at high speeds by engagement with the pipe. In order to reduce vibration of the rotating pipe, the axis of each of these shafts 304 and the axis of the pipe should be parallel. Also, location of the axis of each of these shafts 304 should be strictly controlled in order that the directional force exerted on the pipe by the tires is properly balanced to reduce vibration. For example, vibration of a pipe may result if the tire 260 supported by arm 258 contacts the pipe at a point higher than the contact point of the upper tire supported by arm 256. Also, the cradle 254 may be properly centered below the pipe, but if the arms are not properly centered, all four tires may not continually engage the rotating pipe, thus contributing to undesirable vibration of the pipe.

The steady rest assemblies of the present invention enable the threading machine to effectively cut high quality threads, since the pipe is adequately supported while being rotated at high speeds without allowing excessive vibration of the pipe. The cradle 254, arms 256 and 258, and clevis member 280 are cast rather than fabricated, to better control the precise location of shafts 276, 292, and 304. These cast components may be easily reinforced to provide desired strength, and are less likely to experience warpage or deformation than fabricated weldments. Also, a steady rest assembly comprised primarily of cast components is better able to absorb vibrational forces and is less likely to allow a resonant vibration of the pipe compared to fabricated components, because critical tolerances may be easily controlled and the arms are reinforced to reduce deflection. An economic advantage is also realized by utilizing cast components, since no bearings are required to support these shafts. Low friction and wear occur between the outer diameter of the steel rods and the inner diameter of the broached apertures in these castings, and thus the casting material serves as the bearing surface for the rotating rods.

In order to reduce warpage of the arms, both arms may be cast as a single piece, and an adjoining rod portion 306 and notch sections 310 and 312 (shown in phantom lines in FIG. 8) may be cut away subsequent to machining or broaching the apertures utilized by shafts 276, 292 and 304, but prior to assembly. As shown in FIG. 9, each of the arms includes a lower yoke portion 314 which stradles the cradle 254 and is press fit in place. The supported member, i.e. the arm, is not fitted into an aperture in the supporting member, i.e. the cradle, but rather is pressed about the supporting member. This feature enables the full width of the supporting member to be in engagement with the shaft 276, and allows the supported member to engage the rod at two spaced locations. The yoke portion 314 therefore substantially contributes to the proper axial orientation of the shafts 304 and the axis of the pipe. Referring to FIG. 1, this feature substantially reduces any undesirable east-west tilting of the arms with respect to the cradle, and thus keeps the axis of the shafts 304 for each of the tires properly parallel with the axis of the pipe. This same feature, and a comparable advantage, may be utilized in the design of clevis member 280, wherein yoke portion 316 may be press fitted over arm 258.

Each of the steady rest assemblies utilizes at least three tires, and preferably four tires, to maintain the desired stability for the rotating pipe. In this manner, excess radial vibration of the rotating pipe in any direction is effectively prevented, which is not possible with an arrangement having less than three tires per steady rest assembly. Pnuematic tires may be employed, or alternatively solid rubber tires, foam-filled tires, or tires fabricated from a resilient plastic material may be utilized.

Each of the cylinders 264 may be pneumatically powered to open and close the arms and the tires about the pipe. Alternatively, air pressure may be used to close the tires about the pipe, and the absence of any pressure will allow the arms to pivot to an open position by gravity. Air pressure utilized to retract the cylinders 264 may be set at a pre-determined maximum pressure, so that the tires exert a certain desired force on the pipe.

It is understood that in the closed position, the location of both the upper tires 260 and the lower tires 262 will change for different diameter of pipe. In FIG. 8, for instance, the tires are shown in a closed position in engagement with the pipe, and phantom lines depict the closed position of the tires for a slightly larger pipe.

Cylinders 264 are preferably pneumatically powered, and neither are fully retracted when the tires engage the pipe. Radial vibration of the pipe will therefore instantaneously extend or retract one or both of the cylinders, and the constant application of predetermined air pressure will tend to return the tires to the original position. The air pressure therefore acts as a dampener to further reduce radial vibration of the pipe.

Referring now to FIGS. 1 and 8, the operation of the steady rest assemblies will now be described. In FIG. 1, the steady rest assemblies are only used in conjunction with the threading operations, since those are the only operations when the pipe handling system need be adapted to support a rotating pipe. The steady rest assembly depicted in FIG. 8 could be employed, however, in any operation wherein support for a rotating pipe is desired.

Referring to the pipe handling apparatus used in conjunction with the threading machine 14, one joint of pipe is rolled westwardly on powered V-rollers 54 while the threading operation is being performed on the preceding length of pipe. Once this threading operation is complete, the V-rollers 56 may be pivotably raised to their upper position, and the steady rest assemblies 66 may open to transfer support for the pipe from the tires of the steady rest assembly to the V-rollers 56. When this is complete, the steady rest assemblies may tilt about shafts 266 so that the tires are below the level of the V-rollers. Thereafter, the plates 50 may be caused to cycle, transferring a pipe from the V-rollers 54 to the V-rollers 56, and simultaneously transferring the threaded pipe from the V-rollers 56 to the southward rails 68. The steady rest assemblies may then be raised to their upright position, and the cylinders 264 activated to close the tires about the pipe. After the V-rollers 56 have been lowered, the threading operation may commence with only the tires in contact with the rotating pipe. Once the threading operation is complete, the above cycle may be automatically repeated.

The raising and lowering of the V-rollers 56 may be accomplished by a suitable power means, such as air or hydraulic cylinder 67 depicted in FIG. 1. Connected to the power means is a linkage mechanism (not depicted) for pivotably raising and lowering the V-rollers. Similarly, the tilting of the steady rest assemblies about the shafts 266 may be accomplished by power means and a linkage mechanism. In either of these cases, the drive means may power all the V-rollers 56 or the steady rest assemblies 66 used in conjunction with the threading machine 14, or individual drive motors may be used for each of the V-rollers 56 or steady rest assemblies 66. It is understood that the raising and lowering of the plurality of V-rollers for engagement or disengagement with a specific pipe is accomplished simultaneously, and that similarly the plurality of steady rest assemblies used in conjunction with a particular threading machine simultaneously open, simultaneously close, and simultaneously tilt.

Figure 11:
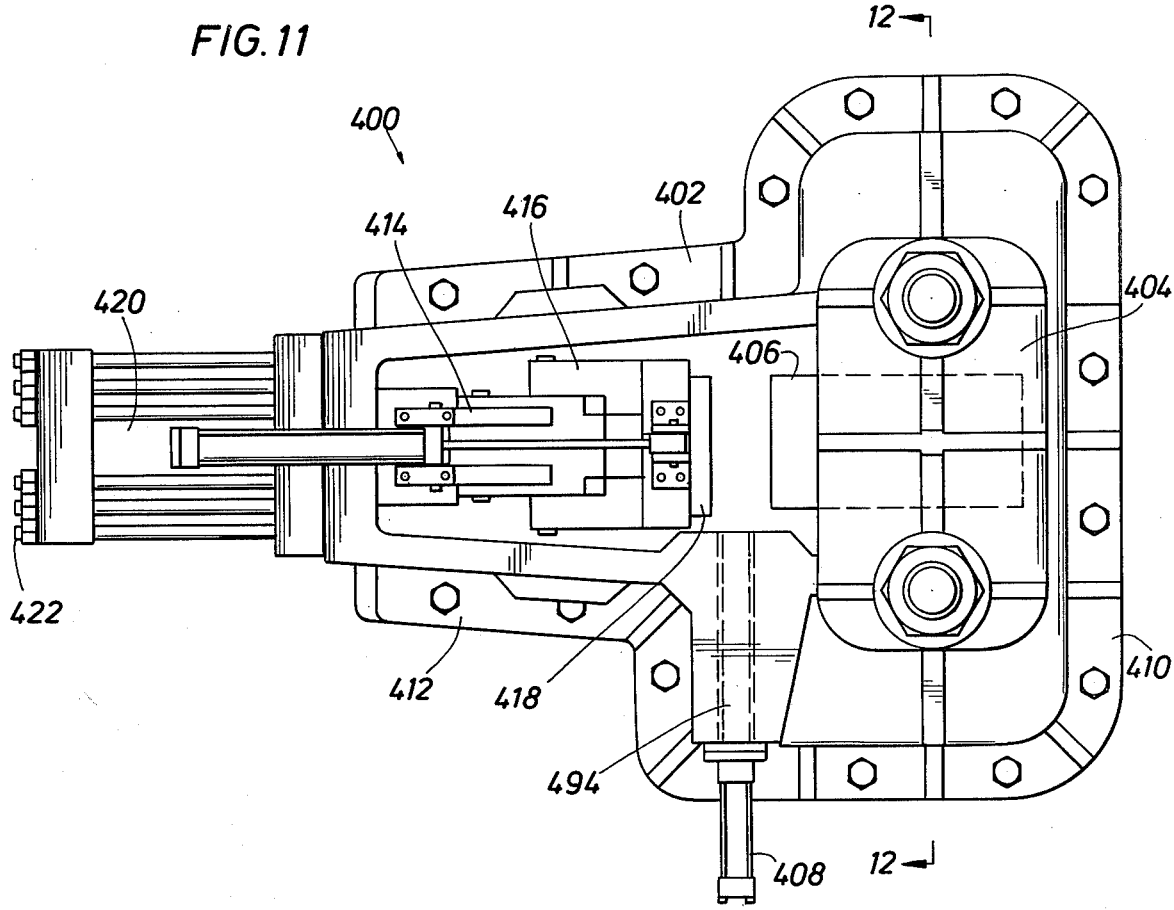
FIG. 11 is a simplified top view of the press generally depicted in FIG. 1.
Figure 12:
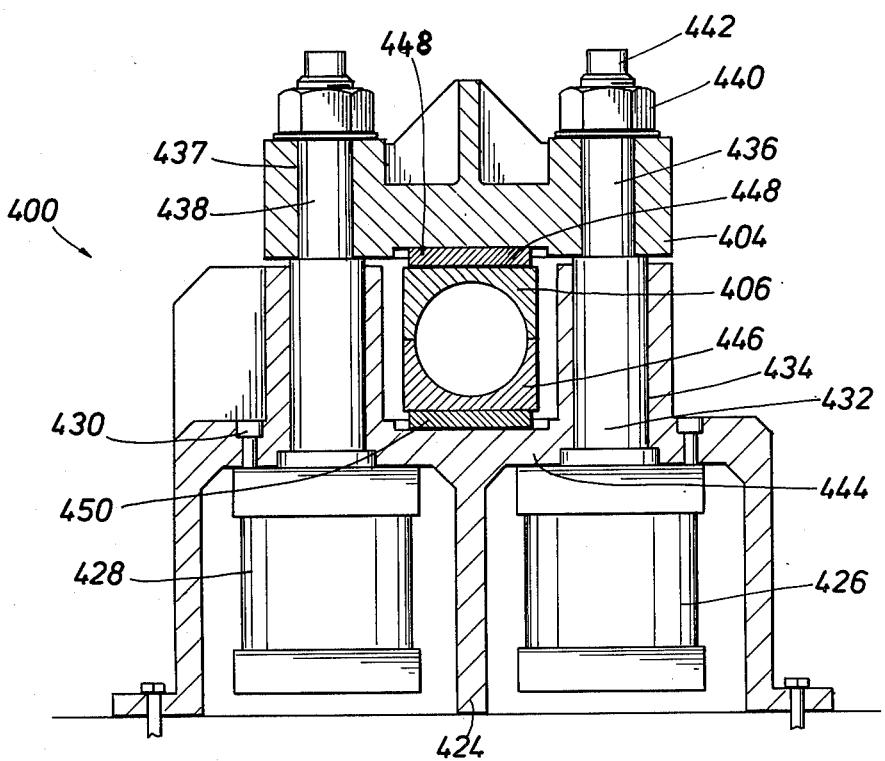
FIG. 12 is a cross sectional view of the press depicted in FIG. 11.
Figure 13:
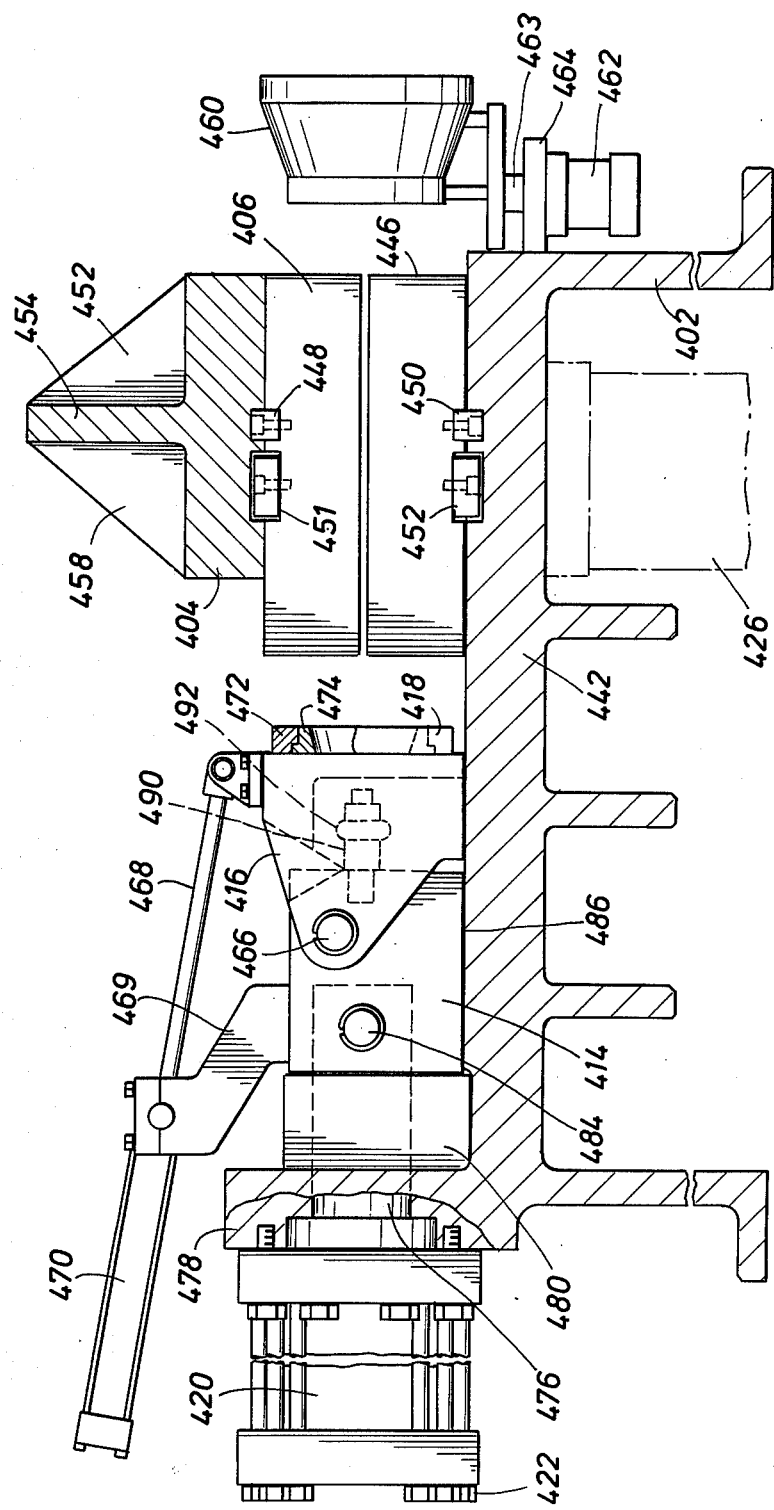
FIG. 13 is a side view, partially in cross section, of a portion of the press shown in FIGS. 11 and 12.

FIGS. 11, 12 and 13 depict the apparatus of the press 12 shown in FIG. 1. The press may be particularly adapted for forming a box portion or a pin portion on an end of the pipe, and for preventing misalignment of that box portion or pin portion with the axis of the pipe. Further, the press is adapted for efficiently forming a box portion on a pipe having uniform cross-sectional characteristics, including outer and inner concentric wall surfaces and the absence of excessive flash.

FIG. 11 is a top view of the press 400, showing the base 402, the movable top platen 404, upper insert die 406, and the hydraulically powered stop cylinder 408. The pipe enters the press from the front end 410, and the top platen and insert die are vertically movable for clamping the pipe in a stationary position.

The deforming and reforming operations on the box portion are accomplished in part by the apparatus toward the read end 412 of the press, including swage nut 414, trunnion 416, and swage die 418. Power for the deforming and reforming operation is provided by a horizontally positioned hydraulic cylinder 420, bolted to the base 402 by a plurality of bolts 422.

FIG. 12 depicts a cross-sectional view of the front portion of the press 400, which clamps the pipe in place. The base of the press is preferably cast, and center leg support 424 is provided between clamping cylinders 426 and 428. The hydraulic clamping cylinders are bolted to the base by a plurality of bolts 430, and sleeve portions 432 of each hydraulic cylinder extend through bored appatures 434 provided in base 402.

Each of the hydraulic cylinders includes a respective rod 436 and 438 which may simultaneously extend to raise the upper platen 404. Nuts 440 are provided on the threaded end portion 442 of the rods, so that when the rods are retracted, the upper platen approaches the base 402. Base 402 includes a horizontal shelf or lower platen 444 which supports lower insert die 446. Both the upper insert die 406 and the lower insert die 446 may be secured to their respective platens by a plurality of bolts (not depicted).

Grooves may be milled in the upper platen 404, and corresponding grooves may be milled in the upper insert die 406, to accomodate one or more shear keys 448. Similar grooves may be milled in both the lower platen 444 and the lower insert die 446 to accomodate lower shear keys 450. Shear keys 448 and 450 are provided as a failsafe in the event excessive radial force is applied to a pipe secured by the press. Also, location keys 451 and 452 may be provided, as shown in FIG. 13.

FIG. 13 is a cross-sectional view of a portion of the press depicted in FIGS. 11 and 12. The upper platen 404 is shown to contain a vertical reinforcing member 454 and gussets 456 and 458. In front of upper insert 406 and lower insert 446 is positioned a hollow cone member 460 adapted for receiving an end of the pipe. After the forming operation is complete, top platen 404 is raised by the hydraulic cylinder, and the cone member 460 secured to the base 402 restricts upward movement of the pipe so that the pipe must disengage from the upper insert die 406. It is possible for the pipe to stick within the lower insert die 446, and hydraulic cylinder 462 secured to the base 402 by plate 464 may be automatically activated to jar the pipe loose from the lower insert die 446. A rush of hydraulic fluid to cylinder 462 causes extension of cylinder rod 463 connected to the cone member 460, so that the cone member 460 is briefly raised upward by the hydraulic cylinder 462. In this manner, the pipe is moved slightly upward for disengagement from the lower insert die 446, and then returns to its original position.

Trunnion block 416 pivots about swage nut 414 at the location of pin 466. Cylinder rod 468 is pivotably connected to trunnion block 416 and may be extended or retracted by hydraulic cylinder 470 to raise or lower trunnion block 416. Bracket assembly 469 mounted on movable swage nut 414 supports hydraulic cylinder 470 and cylinder rod 468. Swage die 418 is mounted on trunnion block 416, and comprises an annular retaining collar 472 and an annular tapered swage insert die 474.

Cylinder rod 476 of the hydraulic cylinder 420 extends through the hydraulic cylinder support 478, and through guide block 480 having a bored aperture 482 with a diameter only slightly larger than the outer diameter of the cylinder rod 476. The cylinder rod is connected to swage nut 414 by pin 484, so that swage nut 414 slides toward the front end of the press along machined surface 486 when the hydraulic cylinder 420 extends rod 476.

Secured to the swage nut 414 is mandrel assembly 490, having a donut-shaped die 492 adapted for engagement with the end of the pipe. The mandrel assembly 490 may be threadedly connected to the swage nut 414, to facilitate efficient replacement of various diameter dies 492 for different diameter pipe or pipe having different box end configurations.

In order to ensure proper alignment of the mandrel assembly 490 and the swage die 418 with the axis of the pipe secured by insert dies 406 and 446, these components are preferably supported by a single piece cast base 402. A single component base provides the supporting legs for the press, the lower stationary platen, and the supporting structure for the deforming a reforming tools. Critial axial alignment between the secured pipe and the forming tools may be easily controlled because of the unity feature of the base 402.

Lower insert die 406 is stationary, and provides the basis for fixing the center line of the secured pipe at a predetermined position. The hydraulic cylinders 426 and 428 raise and lower the upper platen 404 and upper insert die 406 from engagement and disengagement with the pipe. This embodiment fixes the center line of the secured pipe at a certain position with greater reliability, and allows the insert dies 406 and 446 to be easily inserted for different diameter pipe.

The sleeve portion 432 of hydraulic cylinder 426 and 428 extends through the bored aperture 434 in the base 402, and similarly the cylinder rods 436 and 438 extend through bored apertures 437 in the upper platen. The diameter of the bored apertures is only slightly larger than the components within these apertures, so that the base and upper platen provide guide surfaces for maintaining proper alignment of the upper and lower platens. In the critical closed position, almost the entire length of the sleeve portion 434 is fully guided by the base 402 to prevent movement of the sleeve portion 437, and almost the entire length of pistons 436 and 438 are similarly in guided engagement with the upper platen 404. Alternatively, the sleeve portions 432 may be eliminated, in which case the rod of each hydraulic cylinder would be guided by a bored aperture only slightly larger than the diameter of the rod.

Hydraulic cylinders 420 may be activated to cause the mandrel assembly to move into and out of engagement with the end of the pipe. Movement of the mandrel assembly 490 is vertically restricted since supporting swage nut 414 slides on machined surface 486 of fixed base 402. To further ensure that the axis of the mandrel assembly and the axis of the pipe are properly aligned, guide block 480 is provided which restricts non-axial movement or play of rod 476. The center line of the mandrel is therefore fixed, as is the center line of the pipe, to ensure proper axial alignment of the mandrel assembly 490 and the pipe.

In similar fashion, non-axial movement of the trunnion block 416 and swage die 418 is limited, and the bottom of the trunnion block slides along machined surface 486 as rod 476 is extended. Axial movement of both the mandrel assembly 490 for engagement with the pipe and axial movement of the swage die 418 for engagement with the pipe is therefore obtained from the same powered hydraulic cylinder 420 transmitted through the same rod 476. Regardless of the proper axial alignment of the mandrel assembly and swage die with the pipe, it is understood that the axis of the mandrel assembly and the axis of the swage die will be identical when these components contact the pipe. Since the swage die 418 forms the end of a pipe with an axial directed force rather than a radial directed force, the end of a pipe is concentric and does not contain any flash marks.

Even though the axis of the mandrel assembly 490 and the axis of the swage die 418 should be properly aligned with the axis of the pipe, as described above, it is possible that the end of the pipe may not be concentric with the portion of the pipe secured by dies 406 and 446, or that the outer periphery and inner periphery of the end of the pipe may not be concentric due to pipe tolerances from the mill. For these reasons, it may be desirable that donut die 492 be rotatable about mandrel assembly 490 and be loosely fitted on the mandrel assembly to allow the die 492 to "float" slightly to become properly aligned with the inner periphery of the end of the pipe as the forming operation begins. Likewise, the swage insert die 474 may be rotatable about the retaining collar 472 and may be loosely mounted to float slightly with respect to the retaining collar.

Referring to FIGS. 1, 11, 12 and 13, the operation of the press 400 will be described. As the pipe is fed into press 12 by V-rollers 46, cylinder 408 may be activated, causing the extension of rod 494. Westward movement of a pipe is complete when the west end of the pipe engages stop 494, at which time hydraulic cylinders 426 and 428 may be simultaneously activated causing upper insert die 406 to descend vertically and secure the pipe against lower insert die 446. Hydraulic cylinder 408 may then be reactivated, causing retraction of stop 494.

During this last operation, cylinder 470 may be activated to retract cylinder rod 468, pivoting trunnion block 416 to an upper position. Hydraulic cylinder 420 may be activated, causing mandrel assembly 490 to engage the end of a pipe and radially expand the walls of a pipe in an outward direction. The mandrel assembly 490 is thereafter retracted, and hydraulic cylinder 470 is activated to lower trunnion block 416 into engagement with surface 486. Hydraulic cylinder 420 is again activated, causing insert swage die 474 to engage the pipe and contract the end of the pipe to its proper swage position. The swage die 418 is then retracted, and the forming the pipe is complete.

Hydraulic cylinder 426 may then be activated, raising upward insert die 406, while cone 460 secured to the base 402 disengages the pipe from the upper insert die 406. Hydraulic cylinder 462 may then be activated jarring the pipe free from the lower insert die 446. V-rollers 46 may subsequently be activated, allowing the pipe to exit the press and proceed to the next operation. As previously mentioned, the end of the pipe to be formed may be heated prior to the forming operation and/or stress relieved subsequent to the forming operation.

Although the operation of the press has been described above for forming one type of box portion, it should be understood that the press 400 may also be utilized to form a box end wherein the end of the pipe is only expanded outwardly, and a subsequent swage operation is not required. Similarly, the press 400 may be used to form a pin portion on the end of a pipe, wherein the end of the pipe is contracted during a swage operation, and a mandrel is not used to expand the end of the pipe.

As previously stated, the V-rollers 56 do not transport the pipe to and from the threading machine 14. Although powered V-rollers could perform that function, the threading machine 14 is not a suitable stop or a suitable support for a stop for terminating westward movement of the pipe. If the threading machine were to support such a stop, the jarring action of the pipe engaging the stop could damage the threading machine or necessitate frequent adjustment to the machine. Instead, the cart 62 clamps the pipe and rides on cart base 64 to carry the west end of the pipe into and out of the threading machine 14.

Figures 14, 15:
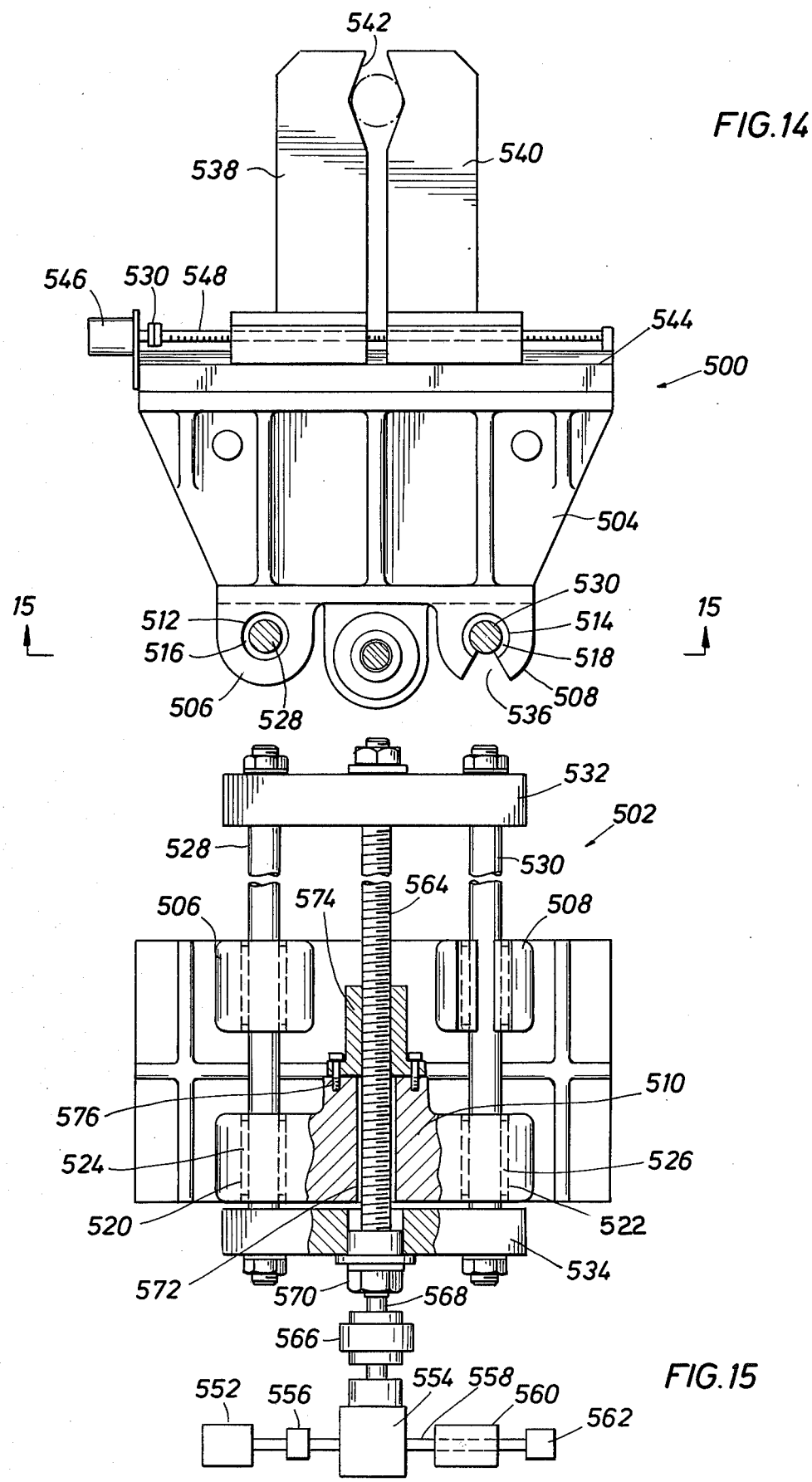
FIG. 14 is a simplified end view of a portion of the cart assembly generally shown in FIG. 1.
FIG. 15 is a cross-sectional view of the cart assembly depicted in FIG. 14, and further generally illustrating the power and control means for the cart assembly.

FIG. 14 depicts the cart 500, and FIG. 15 is a partial cross-section of FIG. 14 and also illustrates the cart base 502. The cart 500 consists of a cast aluminum body 504 having two downward extending cart supports 506 and 508, and a downward extending front plate 510. Each of these cart supports has an aperture 512 for receiving bushing members 516 and 518, respectively. The downward extending front plate 510 also contains two apertures 520 and 522, each axially aligned with one of the apertures in the cart supports. The apertures 520 and 522 similarly contain bushings 524 and 526, respectively. An elongate shaft 528 passes through bushings 516 and 524, and an elongate shaft 530 passes through bushings 518 and 526.

The cart 500 rides on shafts 528 and 530, which are supported at their ends by support blocks 532 and 534. If no additional support is required for the shafts, the downward extending cart supports and front plate may be of the closed configuration, e.g. bushing 516, wherein the bushing completely enwraps the shaft. If one or more additional supports are desired for the shafts 528 and 530, the cart supports 506 and 508, the front end plate 510, and all the bushings may be adapted for allowing the cart 500 to pass over additional upward extending shaft supports (not depicted). As illustrated in FIG. 14, the bushings may then be similar to split bushing 518, and each of the cart supports and the front end plate may be machined with V-shaped notches 536 allowing for passage of the cart by the additional shaft supports.

The cart 500 contains movable blocks 538 and 540, each having a V-shaped pipe gripping surface 542. Blocks 538 and 540 move along the top surface 544 of body 504, powered by hydraulic motor 546. Motor 546 is connected to lead screw 548 by coupling 550. Half of the length of lead screw 548 contains clockwise threads, while the other half contains counter-clockwise threads, so that when motor 546 is activated, blocks 538 and 540 move in opposite directions of equal amount to open or close about the pipe.

It may be seen that the V-shaped gripping surfaces 542 are adapted to grasp pipe of various diameters. Regardless of the diameter of the grasped pipe, the axis of the pipe will be at the same constant elevation as the apex of the two V-shaped surfaces. Since each of the blocks 538 and 540 moves toward or away from the pipe at the same rate, the axis of the pipe will also not change when the blocks grip pipe of different diameter.

The cart 500 is powered by a bi-directional motor 552 which is coupled to right angle gear box 554 by coupling 556. Gear box 554 is connected to lead screw 564 by coupling 566 and shaft 568. Bearing block 570 is secured to support block 534 and supports the ends of screw 564 and shaft 568. The downward extending front plate 510 contains an aperture 572 for receiving a lead screw 564, and lead screw nut 574 is connected to the plate 510 by a plurality of bolts 576. Nut 574 is threadedly connected to the lead screw 564, and moves axially as the lead screw is rotated. Shaft 558 is also connected to gear box 554, and passes through brake assembly 560 for connection at the other end to a shaft encoder 562.

Referring now to FIGS. 1, 14 and 15, the operation of the cart will now be described. The pipe is transferred from V-rollers 54 to V-rollers 56 (in their raised position) by plates 50. Motor 546 is activated, causing blocks 538 and 540 to grasp the pipe. Thereafter, motor 552 is activated, causing rotation of lead screw 564 and westward movement of the cart 500 along shafts 528 and 530. Each rotation of shaft 564 results in a certain predetermined movement of the cart, and once the cart reaches a predetermined point in relation to the cart base and threading machine, the speed of motor 552 is lowered and further rotation of the lead screw 564 proceeds at a slower rate.

When this first predetermined point of the cart is reached, the number of rotations of the shaft 558 is thereafter measured by shaft encoder 562. Since a predetermined relationship exists between the rotation of shaft 564 and the rotation of shaft 558, the encoder 562 effectively measures the position of the cart with respect to the first predetermined point. Once the cart has proceeded to a second predetermined point, the west end of the pipe is in its proper position for being grasped by the threading machine 14 and shaft encoder 562 sends a signal to motor 552 terminating further rotation of lead screw 564.

The first predetermined position of the cart may be determined when the cart breaks the line of a fixed electronic eye (not depicted). Alternatively, the first predetermined position may be determined by shaft encoder 562, if the cart 500 clamps the pipe at a predetermined fixed place. The shaft encoder 562 therefore operates as a transducer, transforming a number of revolutions of lead screw 564 into a certain distance of the cart from the first predetermined point. When tooling in threading machine 14 is changed for cutting different type threads or for cutting threads on pipe of different diameters, the desired location of the west end of the pipe may change. Encoder 562 may be easily controlled so that the signal to motor 552 is sent after a certain number of revolutions of the shaft 558. In this manner, the encoder 562 can be used to easily regulate proper placement of the end of the pipe with respect to the threading machine.

Brake assembly 560 is responsive to signals from selected limit switches, and is adapted to be engaged only if the cart inadvertantly travels beyond the first predetermined point before an appropriate signal reaches shaft encoder 562, or if a cart travels beyond the second predetermined point for any reason. The brake assembly 562 therefore functions as a failsafe device, to protect the threading machine 14 from being damaged by the end of the pipe.

Once the cart 500 has moved the west end of the pipe into proper position within the threading machine 14, the jaws of the threading machine may be activated to grip the pipe. Simultaneously, motor 546 may be activated causing gripping members 538 and 540 of the cart assembly to disengage the pipe. After the threading operation is complete, motor 546 may be activated causing gripping members 538 and 540 to again grip the pipe, while the jaws of the threading machine disengage the pipe. Motor 552 may be activated, causing rotation of lead screw 564 and eastward travel of cart 500. Once the cart has traveled to its initial starting position adjacent the east end of cart base 502, motor 552 may be deactivated stopping further movement of the cart 500. If desired, the brake assembly 560 may be responsive to a limit switch placed eastwardly of the initial cart position, to ensure that the cart does not travel beyond its initial starting position.

It will be understood that the west end of the pipe has now exited the threading machine 14, and motor 546 may be activated causing the gripping members 538 and 540 to disengage the pipe. The pipe at this time may be supported by the V-rollers 56, and is in a position for being transferred to subsequent operations in the pipe threading system.

The gripping surfaces 542 of gripping members 538 and 540 preferably move linearly in a direction radial to the pipe, so that the axis of the pipe is properly aligned and the pipe is effectively gripped without crushing or damaging the pipe. When the fluid pressure to the hydraulic motor 546 reaches a preselected value, members 538 and 540 have gripped the pipe with sufficient force to secure the pipe, and additional hydraulic pressure will not be supplied to the motor 546. Lead screw 548 enables a large radial force to be applied to the pipe by the relatively small hydraulic motor, because of the force multiplying effect of the threads of lead screw 548.

The position of cart 500 is controlled by operation of a hydraulic motor, which allows for effectively changing speeds of the lead screw 564 by changing fluid flow to the hydraulic motor. In order to properly regulate the position of the cart, lead screw 564 may be powered by conventional gearing to the hydraulic motor 552. This direct gearing avoids wear problems and shock typical to chain drive systems.

Although the cart 500 has only been described in relation to the threading operation performed by the threading machines, it is within the concept of this invention that a similar cart may be employed to transfer the pipe to the forming operation accomplished by a press. Also, a similar cart may be utilized to transfer the pipe to the fluid test station. Finally, it may be desirable to utilize one or more similar carts to transfer one or more fluid test stations to the pipe.

Drift station 26 shown in FIG. 1 is illustrated in further detail in FIGS. 16 and 17, and comprises a powered drift rod positioner 600, drift die 602, connecting rod 604, pipe support stand 606 and modular base 608. The drift die 602 is propelled through the length of the pipe, to ensure that the internal diameter of the pipe remains within an acceptable range throughout the length of the pipe.

The drift rod positioner 600 comprises a lower base 610 and an upper body 612. Handle member 616 of screw jack 614 may be rotated, causing extension or retraction of nut 618 along threaded rod 620. Upper body 612 may rest on nut 618, so that the elevation of the upper body 612 may be controlled by rotating handle 616 of screw jack 614.

Mounted on the upper body 612 are two vertically spaced rollers 622 and 624. Each drive roller rotates about its shaft 626, with a pair of bearings 628 supporting the end of each shaft. Hydraulic drive motor 630 may be connected to a conventional gear box for driving either the upper roller 622 or the lower roller 624, or both rollers. If only one roller is driven by motor 630, the other roller acts as an idler roller.

The periphery of each rollers 622 and 624 is adapted for engagement with the outer diameter of rod 604, and may be grooved or V-shaped to enhance the frictional engagement of the rod 604 and the rollers. The rod 604 is pinched between the rollers, and powered rotation of one or both of the rollers drives the drift die 602 through the pipe. In order to maintain the desired force on the connecting rod 604 by the rollers, the top roller 622 is mounted on plate 632, which pivots about pin 634 at one end of the plate. At the other end of the plate is retaining bolt 636 and spring 638, which apply a retaining or downward force on plate 632. The bolt 636 and spring 638 allow for movement of the roller 622 with respect to the connecting rod 604, but maintain a desired force on the plate 632 and on the connecting rod 604. Further, the amount of the force on the connecting rod may be easily adjusted by rotating bolt 636 and thus further compressing or expanding the spring 638.

The drift die 602 is circular in cross-section, and may be tapered at both ends to facilitate movement in either direction within the pipe. When connecting rod 604 is fully extended, die 602 will have passed through the entire length of the pipe and will be toward the east side of the line depicted in FIG. 1. When the connecting rod 604 is retracted, the die 602 will be on the west side of the line adjacent the powered positioner 600. At this time, the connecting rod 604 may extend westwardly of positioner 600, or may be coiled under positioner 600 to reduce space requirements.

The pipe may rest on a plurality of M-shaped brackets 640 supported by stand 606, or alternatively by M- shaped trough 642. Vertical support 644 may be positioned at various lengths to adequately support the pipe. The M-shaped brackets or trough may continue for a short distance beyond the ends of the pipe, to support the die 602 prior to entering and after exiting the pipe. The length of the stand 606 may therefore be slightly longer than the longest length of the pipe to be threaded, since stand 606 is adapted for supporting pipe of various diameters and length. A positioner 600 may be mounted on a modular structural base 608. If desired, all or some of the supports 644 may be mounted on the same base, or may be mounted on another structural base.

Tapered die 602 has a diameter which is selected for checking the I.D. of a certain diameter pipe, and when pipe of another diameter is threaded on the line, the die 602 is changed. For that purpose, the end of the connecting rod 604 may be provided with a collar 646, which is adapted to be mounted to the various dies 602.

Hydraulic motor 630 drives one or both of the rollers 622 and 624. The desired velocity for propelling die 602 may change with the diameter, length and type of pipe being checked. This velocity may be easily controlled by regulating fluid pressure to hydraulic motor 630. Further, hyrdraulic motor 630 enables the die to be easily stopped once having passed through the pipe, without the need for braking apparatus accompanying the drive means.

Since the axis of the die 602 will change for different diameter pipe, it is understood that the elevation of the rod 604 at the place of connection to the die 602 will change. It is important, however, that the connecting rod 604 maintain a substantially constant elevation between the rollers 622 and 624 and the collar 646. If a substantially constant elevation is not maintained, the connecting rod 604 may tend to buckle during repeated use, and thereafter may not be capable of pushing die 602 through the pipe.

The powered drift rod positioner 600 utilizes a screw jack 614 to alter the elevation of rollers 622 and 624. The elevation of the connecting rod 604 is therefore changed for different diameter pipe, rather than attempting to maintain a constant center line for various diameter pipe. This enables the connecting rod 604 to keep a substantially constant elevation between the rollers and the die 602. If desired, the bracket 640 or trough 642 may be at a slightly higher elevation at both ends of the pipe, so that the wall thickness of the pipe will not change the elevation of the die 602 as it enters or exits the pipe.

The operation of the drift station will hereinafter be described. The pipe may be positioned on power V-rollers 98 by plates 96, and the pipe is thereby positioned westwardly against the stop 95 in preparation for the drift operation. Simultaneously, the plates transfer a pre-positioned pipe from the V-rollers 98 to the plurality of stationary V-shaped guides 97, or alternatively to M-shaped brackets 640 on stand 606. The elevation of the rollers 622 and 624 may be properly adjusted by jack 614, as previously described.

With the pipe properly in place, an operator may activate motor 630, which pushes connecting rod 604 and die 602 westwardly through the pipe. Once the die passes through the pipe, the die 602 may engage a limit switch, which will automatically reverse the direction of the motor 630 and pull the die back through the pipe. When the die 602 reaches its original position on the west side of the pipe, another limit switch is engaged and motor 630 is stopped. If there is improper frictional engagement between the rollers 622 and 624 and the connecting rods 604, the operator may turn bolt 636 to either reduce or increase the force of the rollers on the connecting rod.

The hydraulic power system feeding motor 630 may monitor the fluid pressure by conventional means to the motor. A predetermined range of fluid pressure may be necessary to propel the die 602 through a proper pipe. If the die 602 engages substantial resistance, such as a dent in the pipe, the fluid pressure to motor 630 will rise above that predetermined maximum limit. If the limit is exceeded, a sensor may be activated, which will automatically reverse the direction of motor 630. Thus, when the die 602 engages a dent in the pipe, the connecting rod 604 is not caused to buckle because of continued power being supplied to the connecting rod by the rollers 622 and 624. If the die 602 does not properly pass through the length of the pipe, the operator may attempt a second drift test of the pipe, or may reject the pipe as unsatisfactory.

Figure 18:
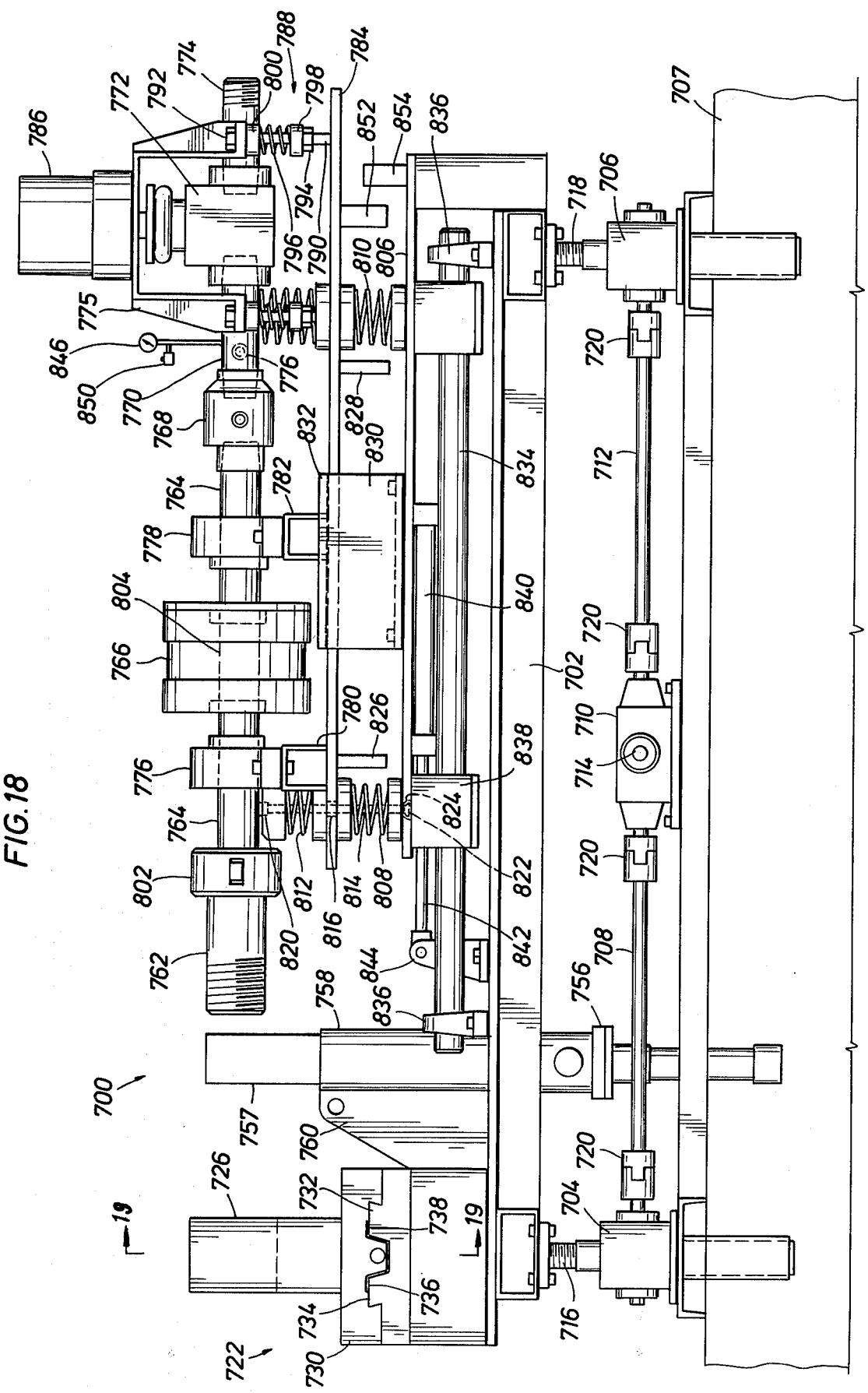
FIG. 18 is a simplified side elevation of a fluid test unit generally depicted in FIG. 1.

Referring to FIGS. 18 and 19, fluid test unit 28 will now be described in detail. The fluid test unit is adapted to automatically fill a pipe with a liquid, pressurize the pipe, and monitor fluid pressure for a short time to insure that the pipe threads do not leak.

Fluid test unit 700 is mounted on platform 702, which is supported at its corners by two front screw jacks 704 and 704A (not depicted) and two back screw jacks 706 and 706A (not depicted). These screw jacks may be used to raise or lower the platform 702, as described below. Each of the jacks may be mounted on modular base 707, allowing the entire unit 700 to be easily transported to a new location.

Shaft 708 may connect jack 704 to jack gear box 710, and another shaft 712 may connect the gear box to jack 706. Shaft 714 of gear box 10 may be rotated by a tool or a hydraulic motor (not depicted) which will rotate both shafts 708 and 712, thereby raising screws 716 and 718 of jack 704 and 706, respectively. Similar shafts and a gear box may be provided for jack 704A and 706A. If desired, a third control gear box (not depicted) also having two shafts may connect the two jack gear boxes, so that all four jacks may be raised or lowered simultaneously while operating a single control gear box. The platform 702 is therefore adapted to be raised or lowered by four jacks, and each jack may raise or lower a corner of rectangular platform 702 by the same amount as the other jacks when the control gear box is activated.

At times, it may be necessary to adjust the position of one corner of platform 702 with respect to the other corners of platform 702. Accordingly, each of the jacks may be raised or lowered independently of the other jacks in the following manner. The shaft connected to the selected jack may be disassembled from the jack gear box at coupling 720, the jack may be raised or lowered manually as desired, and the coupling 720 thereafter reassembled.

At the front end of platform 702 is mounted clamp assembly 722, which is shown partially in cross section in FIG. 19. Two gripping heads 724 and 726 are slidably movable on a clamp assembly base 728. Lower portion 730 of each head contains dovetail machine surfaces 723 and 734, adapted for mating engagement with machine projection 736 and 738 of base 728. Heads 724 and 726 therefore slide horizontally in a north-south direction to engage and disengage a pipe.

Movement of the heads is controlled by hydraulic motor 742, which is mounted on motor base 741 fixed to platform 702. Motor base 742 rotates shaft 746, which is connected to the motor by coupling 748. The end of shaft 746 opposite the motor is supported by bearing 748, which is mounted to vertical plate 750 affixed to platform 702.

Affixed to head 724 is nut 752 adapted for threaded engagement with threaded shaft 746. A similar nut 754 is affixed to head 726. The shaft 746 has both clockwise threads adapted for engagement with nut 754, and counter-clockwise threads adapted for engagement with nut 756. As shaft 746 rotates, both heads 724 and 726 therefore move toward or away from the pipe at the same rate.

It may be understood that only the elevation of the center line of the pipe grasped by heads 724 and 726 changes with the diameter of the pipe. The north-south position of the axis remains constant because the heads are driven by the same motor and therefore open and close about the pipe at the same rate. The threads of shaft 746 enable the motor 742 to transmit a large force to the pipe through heads 724 and 726, without crushing or damaging the pipe.

The hydraulic cylinder 756 and vertical guide member 758 are secured to the platform 702. The hydraulic cylinder 756 may be activated to raise or lower a plate 757 or other stop member, so as to fix the position of the end of the pipe before the pipe is clamped by heads 724 and 726. The guide member 758 allows the stop member to move vertically, and provides horizontal support for the stop member when engaged by the pipe. If desired, gusset 760 may also be affixed to the guide member 758 to provide additional support for the stop member. As previously described, the pipe may be properly positioned in the east-west direction after the drift operation is complete. In that case, V-rollers 101 may be replaced by stationary V-shaped supports, and the hydraulic cylinder 756 is not required since the plates 100 may properly position the pipe within the clamp assembly 722.

The fluid test unit comprises a threaded end portion 762, hollow shaft 764, drive means 766 for rotating the shaft 764, swivel joint 768, pipe 770, valve 772, low pressure fill line 774, and high pressure fill line 776. The swivel joint 768 enables fluid from the non-rotating pipe 770 to pass to the rotating shaft 764. The rotating shaft 764, drive means 766, and portion 762 are supported by pillow block bearings 776 and 778, which are mounted on respective supports 780 and 782 each affixed to rectangular plate 784. The non-rotating pipe 770, valve 772, and low pressure fill line 774 are mounted to bracket assembly 775, which also supports hydraulic valve operator motor 786. Bracket 775 may be supported by four bolt assemblies 788 affixed to plate 784.

Each of the bolt assemblies 788 may include a bolt 790, a fixed upper support 792, and adjustable lower support 794, and a spring 796 sandwiched between two cup-shaped washers 798 and 800. The spring 796 is normally under compression, because the weight of the apparatus supported by bracket 775 is acting against the springs 796. The bolt assemblies 788 may be provided on each corner of the bracket 775, and limited movement of this bracket with respect to plate 784 is therefore possible. Because of forces applied to pipe 770 through swivel joint 768, one corner of bracket 775 may drop slightly with respect to plate 784, further compressing its respective spring.

End portion 762 is adapted for threaded engagement with the pipe, and locking coupling 802 is provided for easily disassembling end 762 from shaft 764, and connecting a new end portion of a different diameter on shaft 764. The drive means 766 for rotating the shaft 764 may be a hydraulic motor having a hollow shaft 804. Shaft 804 of hydraulic motor 766 allows for passage of fluid through the hydraulic motor, and is connected to shaft 764 for rotating end portion 762. Rotating shft 764 may be threadedly connected to the left side of swivel joint 768, and non-rotating pipe 770 may be similarly connected to the right side of joint 768. Liquid may therefore enter the low pressure inlet 774, pass through valve 772, pipe 770, swivel joint 768, shaft 764 and motor 776, and enter the pipe through end portion 762.

Plate 784 is vertically spaced from plate 806 by two forward lower springs 808 and 808A (not depicted) and two backward lower springs 810 and 810A (not depicted). Above plate 784 are four upper springs 812, each positioned over one of the lower springs. Each of these lower and upper spring assemblies may be identical, and only one such assembly will be hereinafter described.

Threaded rod member 814 may be mounted to plate 806, and pass through lower spring 808, through aperture 816 in plate 784, and through spring 812. Each of the springs has a cup-shaped washer 718 at each end of the spring, and upper spring 812 is compressed between the plate 784 and a nut 820 threaded to the end of rod 814. A swivel head 822 may be attached to the end of the rod 814 opposite the nut 820. The swivel head 822 is adapted for engagement with the walls of aperture 824 in plate 806, allowing rod 814 to tilt in any direction about the swivel head 822. Although only one such rod member 814 is depicted in FIG. 18, it is to be understood that a similar rod member and accompanying nut and swivel head may be utilized on each corner of the plate 784.

Two front pegs 826 and 826A (not depicted) and two back pegs 828 and 828A (not depicted) may be affixed to plate 784. The tip of each of these pegs may normally not engage plate 806, but do serve as stops to prevent excessive downward movement of any portion of plate 784 with respect to plate 806, as will be described below. In order to prevent excessive upward movement of any portion of plate 784 with respect to plate 806, one or more channel members 830 may be affixed to plate 806, with inward directed lip 832 of channel 830 extending over plate 784. Since lip 832 is stationary with respect to plate 806, the lip 830 serves as a stop to prevent excessive movement of any portion of the plate 784 with respect to plate 806.

Plate 806 and the apparatus supported thereby may travel in an east-west direction along two shafts 834 and 834A. Each of the shafts is supported at its ends by shaft supports 836, which are mounted to plate 702. Four bearing blocks 838 are mounted on plate 806 with two of the bearing blocks adapted to travel along each of the shafts 834 and 834A. The plate 806 and end portion 762 thereby travel toward or away from the end of a pipe held stationary by heads 724 and 726. Hydraulic cylinder 840 may be secured to plate 806, and rod 842 of the hydraulic cylinder may be connected to block 844, which is mounted to plate 702. Hydraulic cylinder 840 may be activated to extend or retract rod 842, and thereby move plate 806 along shafts 834 and 834A.

During the fluid test operation, the pipe may be supported by a plurality of V-rollers so that the east end of the pipe is slightly lower than the west end of the pipe. To facilitate filling the pipe with a liquid, for instance, the pipe when tested may be inclined at an angle of 5° from the horizontal, so that the pipe is filled from the low end while air is bled off from the high end. Although the axis of the pipe may change with the pipe diameter, this inclination angle of the pipe may remain constant. In order that the end portion 762 of unit 700 engages the end of the pipe axially aligned with the pipe, the screw jacks may be positioned so that plate 806, and therefore end portion 762, are tapered at the same inclination as the pipe. Thereafter, even though the front and back screw jacks are simultaneously raised or lowered, the end portion 762 will be axially aligned with the pipe to be tested.

Referring to FIGS. 1, 18 and 19, the fluid test operation will now be described. Prior to commencing the fluid test operation, it is understood that the end portion 762 is adapted for threaded engagement with the particular pipe to be tested. Also, the end portion 762 may be inclined at the same angle as the pipe when tested, and the front and back screw jacks may be simultaneously operated so that the elevation of end portion 762 is axially aligned with the pipe when tested.

The pipe may be positioned on V-rollers 101 by plates 100, and the powered V-rollers 101 may transport the pipe eastwardly into the test unit 28. During this operation, the hydraulic motor 742 may be activated, opening heads 724 and 726 to their fullest extent. Simultaneously, hydraulic cylinder 756 may be activated, causing the stop member 757 to rise across the path of axial travel of the pipe. Once the pipe engages this stop, hydraulic motor 742 may be activated for closing head 724 and 726 about the pipe. Once the pipe is clamped, hydraulic cylinder 756 may be activated for lowering the stop.

Hydraulic cylinder 840 may then be activated retracting rod 842 and pulling plate 806 westwardly. While plate 806 is traveling westwardly, motor 804 may be activated, rotating shaft 764 and end portion 762. When the rotating end portion 762 engages the end of the pipe, the threads of the end portion 762 mate with the threads of the pipe, and the end portion 762 is thereby automatically threaded on the end of the pipe. Once this threading operation commences, the motor 804 overrides any axial travel of end portion 762 that might otherwise occur due to cylinder 840, so that cylinder 840 no longer governs further westward travel of end portion 762. When the end portion 762 has been fully threaded into the pipe, the hydraulic fluid pressure to motor 804 rises, automatically triggering a fluid pressure sensor to stop motor 804.

At this time, hydraulic valve operator 786 may be activated, opening valve 772, and fluid may enter pipe 770 through lower pressure fluid inlet 774. Fluid will pass through shaft 764 and enter the inclined pipe through end portion 762. A cap (not depicted) may be manually threaded to the west end of the pipe, or may have been threaded to the west end of the pipe prior to this fluid test operation. If desired, a bleed valve may be installed on the threaded cap on the west end of the pipe, allowing air to bleed as the pipe is filled with liquid.

Once the pipe is filled, the operator may activate motor 786, closing valve 772. A small amount of fluid under high pressure may then enter the pipe through high pressure inlet 776. Once the pipe has been pressurized, fluid injection may be terminated and the pressure monitored by gauge 846 to ensure that the fluid remains pressurized for a sufficient length of time within the pipe. If desired, gauge 846 may be mounted on the cap threaded on the west end of the pipe. In particular, this fluid pressure check will ensure that the threaded ends of the pipe have been properly cut so that other lengths of pipe, couplings, or caps may be installed on these ends while maintaining proper fluid pressure. If proper fluid pressure is not maintained for a sufficient length of time, the pipe may be rejected by the operator conducting this fluid pressure test.

After the pipe has been tested, the cap may be removed from the west end of the pipe allowing the liquid to be recycled through the system. Simultaneously, motor 766 may be activated in the reverse direction, unthreading end portion 762 from the pipe. Also, hydraulic cylinder 640 may be activated causing extension of arm 842 and causing eastward movement of the end portion 762 once unthreaded from the pipe. The plate 784 may travel eastwardly until it engages a limit switch, which deactivates cylinder 840 and motor 766. As a precautionary measure, stop 852 fixed to plate 784 will engage stop 854 affixed to plate 702 if the end portion 762 were to break free from the pipe during a fluid test operation, causing the fluid test unit to be propelled eastwardly.

Once the end portion 762 disengages from the end of the pipe, the hydraulic motor 742 may be activated opening the heads 724 and 726. The powered V-rollers 101 may then be activated rolling the pipe westwardly from the test unit 28. Thereafter, the pipe may continue through the pipe handling system.

As previously explained, an end cap may be installed on the west end of the pipe as part of the fluid test operation, or may be installed prior to this operation. Alternatively, another unit similar to unit 700 but having a threaded end cap may be installed on the west end of the line, for automatically threading an end cap on the pipe.

It is within the concept of this invention to utilize a cart previously described to transport the pipe to the fluid test unit, or alternatively to transport the fluid test unit to the pipe. If a fluid test unit is utilized at both ends of the pipe, as described above, then one or both of the test units may be transported to its respective end of the pipe by a respective cart, and the controlled movement of each cart may be regulated in the manner described for cart 500. If a fluid test unit is used on each end of the pipe, the fluid test unit at the lower end of the pipe preferably fills the pipe, while air is bled off the higher end of the pipe.

The fluid test operation subjects the pipe to very high pressures, and special safety precautions may be taken. The entire fluid test assembly may be housed in a ½" thick steel enclosure, and television cameras may be utilized to observe the operation of the fluid test unit from an operator's position remote from the fluid test unit. If only one test unit is employed, the operator's position may conveniently be at the other end of the pipe near the monitoring pressure gauge. If two fluid test units are employed, the operator's station may be adjacent the drift station, and the pressure gauge at the operator's station may be connected to the tested pipe with a failsafe pressure reduction device, or may be remotely monitored by a television camera.

The fluid test unit 700 is particularly adapted to ensure that the end portion 762 will be properly aligned to thread a pipe without galling the threads of the pipe.

The two front lower springs 808, the two back lower springs 810, and the four upper springs 812 enable limited movement of the end portion 762 in every direction for successfully commencing the threading operation. Each of these eight springs is normally in compression, the top springs 812 being compressed between an adjacent nut 820 and plate 784. If nut 820 is further threaded on rod 814, it will be understood that both the upper and lower springs will be in further compression, while if nut 820 is partially unthreaded from rod 814, the compressional force on the upper and lower springs will be reduced.

To properly start the threading operation, the northeast corner of plate 784 may tend to rise slightly, further compressing its respective top spring 812 while bottom spring 808A expands. Simultaneously, the southwest corner of plate 784 may drop slightly, further compressing the bottom spring 810 and allowing the adjacent upper spring 812 to expand. Similar action is possible for each of the corners of plate 784. The springs may also flex to allow limited north-south and east-west movement of plate 784 and end portion 762. It may be understood that plate 784 and the apparatus mounted thereon "float" on the springs, allowing movement in every direction.

When the motor 766 is energized or the end portion 762 is fully threaded on the pipe, the north side of plate 784 may tend to drop and the south side rise. Excessive tipping of the plate 784 may damage the springs or allow the apparatus supported on plate 784 to break loose from the springs. To limit this tipping motion, pegs 826 and 828 are provided for engagement with plate 806.

The hydraulic motor rotates shaft 724 and end portion 762 without the need for any gear box, clutch, or other drive mechanism. Further, the speed and direction of the end portion 762 may be easily controlled by conventional valving to the hydraulic motor 766.

Some axial misalignment between the rotating shaft 764 and the non-rotating pipe 770 is possible, and swivel joint 768 allows for limited misalignment. If the misalignment between the rotating and stationary portions is excessive or continues for a long period of time, the swivel joint 768 may be damaged. For this reason, the four spring assembly 788 allow for limited movement of the pipe 770 for proper alignment with rotating shaft 764. Also, it may be seen that when the end portion 762 engages or disengages the pipe, an axial driving force is not transmitted through the swivel joint 768, but is transferred to plate 784. The expected life of a swivel joint 768 is therefore increased since it is not subjected to axial driving forces.

Although the present invention is particularly suited for handling, threading and testing pipe, it may be understood that the system, methods, and apparatus described herein may be utilized for many types of elongate products. In particular, the pipe handling apparatus of the present invention may be utilized to position and support elongate members of any type having a generally circular cross-sectional configuration.

Many other alternative forms of a present invention will, of course, be apparent from the foregoing methods and apparatus. Accordingly, the methods, structures, and techniques hereinbefore depicted and discussed are illustrative only, and are not intended as limitations on the scope of the present invention.

What is claimed is:

1. A system for handling joints of pipe of various diameters in a pipe threading operation including pipe rotating means, comprising:
   a plurality of plates rotatable in synchronization for properly positioning individual joints of pipe within said system,
   drive means for rotating a common drive shaft,
   a plurality of gear boxes each containing a plurality of gears interconnecting said drive shaft with a respective one of said plurality of plates and providing substantially all the rotational speed reduction between said drive means and said plates,
   a plurality of powered V-rollers for pre-positioning said pipe in an axial direction within said system,
   a powered cart for grasping a section of pipe and axially transporting said pipe a preselected distance for proper positioning with respect to said pipe rotating means, and
   a plurality of steady rest assemblies for supporting a pipe being rotated by said pipe rotating means, each including (a) a steady rest base, (b) a cradle pivotable about said steady rest base and having extending shafts for engagement with said steady rest base, (c) a pair of arms pivotable about said cradle, (d) at least three tires supported by said pair of arms and adapted for rotational engagement with said pipe, and (e) adjustment means for altering the position of one tire supported by one of said arms with respect to another tire supported by the same arm for properly supporting pipe of various diameters.

2. A system as defined in claim 1, wherein said drive means comprises a variable speed hydraulic motor for rotating said plurality of plates.

3. A system as defined in claim 1, wherein each of said gear boxes includes a cast gear box housing adapted for containing a liquid for lubricating said plurality of gears.

4. A system as defined in claim 3, wherein said plurality of gears rotate about a plurality of gear shafts, and said gear box housing contains a plurality of apertures defining cast bearing surfaces adapted for frictional engagment with said gear shafts.

5. A system as defined in claim 1, wherein each of said gear boxes is adapted for being driven by said common drive shaft positionable at either end of said gear box.

6. A system as defined in claim 1, wherein each of said plurality of plates includes a replaceable wear strip adapted for engagement with said joints of pipe.

7. A system as defined in claim 1, wherein each of said V-rollers includes a plastic body having V-shaped roller surfaces having an inclusive angle of approximately 120 degrees.

8. A system as defined in claim 7, wherein each of said V-rollers is powered by a variable speed hydraulic motor.

9. A system as defined in claim 1, wherein each of said plurality of gear boxes and each of said plurality of steady rest assemblies is mounted on an individual modular base.

10. A system as defined in claim 1, wherein said cart comprises:
    a cart body adapted for linear movement with respect to said threading machine,
    at least two rails for supporting said cart body,
    at least two gripping heads each supported by said cart body and linearly movable for gripping engagement with said pipe, and hydraulically powered cart drive means for positioning said cart body with respect to said threading machine.

11. A system as defined in claim 10, wherein said cart further comprises:
a threaded screw member rotatably responsive to said cart drive means and threadedly connected to said cart body for positioning said cart body with respect to said threading machine.

12. A system as defined in claim 11, wherein said cart further comprises:
encoder means responsive to rotational movement of said screw member for determining the position of said cart with respect to said threading machine.

13. A system as defined in claim 1, wherein each of said steady rest assemblies further comprises:
an air cylinder connected to each of said arms for opening and closing said tires about said pipe.

14. A system as defined in claim 1, wherein each of said pair of arms of said steady rest assembly supports two tires each adapted for rotational engagement with said pipe.

15. A system as defined in claim 1, wherein each of said steady rest assemblies further comprises:
adjusting means for properly aligning said cradle with respect to said pipe rotating means.

16. A system as defined in claim 1, wherein said cradle and said pair of arms of each of said steady rest assemblies is a metal casting.

17. A system as defined in claim 13, wherein each of said air cylinders absorbs vibrational forces being transmitted to said tires by said pipe.

18. A system for handling joints of pipe of various diameters in a pipe threading operation including pipe rotating means, comprising:
a plurality of plates rotatable in synchronization for properly positioning individual joints of pipe within said system,
a plurality of powered gear boxes each containing a plurality of gears interconnected with a respective one of said plurality of plates,
a plurality of powered V-rollers for pre-positioning said pipe in an axial direction within said system, and
a plurality of steady rest assemblies for supporting a pipe being rotated by said pipe rotating means, each including (a) a steady rest base, (b) a cradle pivotable about said steady rest base and having extending shafts for engagement with said steady rest base, (c) a pair of arms pivotable about said cradle, (d) at least three tires supported by said pair of arms and adapted for rotational engagement with said pipe, and (e) adjustment means for altering the position of one tire supported by one of said arms with respect to another tire supported by the same arm for properly supporting pipe of various diameters.

19. A system as defined in claim 18, wherein each of said gear boxes includes a cast gear box housing adapted for containing a liquid for lubricating said plurality of gears.

20. A system as defined in claim 19, wherein said plurality of gears rotate about a plurality of gear shafts, and said gear box housing contains a plurality of apertures defining cast bearing surfaces adapted for frictional engagement with said gear shafts.

21. A system as defined in claim 18, wherein each of said gear boxes is adapted for being driven by a common drive shaft.

22. A system as defined in claim 18, wherein each of said plurality of plates includes a replaceable wear strip adapted for engagement with said joints of pipe.

23. A system as defined in claim 18, wherein each of said V-rollers includes a plastic body having V-shaped roller surfaces having an inclusive angle of approximately 120 degrees.

24. A system as defined in claim 23, wherein each of said V-rollers is powered by a variable speed hydraulic motor.

25. A system as defined in claim 18, wherein each of said plurality of gear boxes is mounted on an individual modular base.

26. A system as defined in claim 18, wherein each of said steady rest assemblies further comprises:
an air cylinder connected to each of said arms for opening and closing said tires about said pipe.

27. A system as defined in claim 1, wherein each arm of said pair of arms of said steady rest assembly supports two tires each adapted for rotational engagement with said pipe.

28. A system as defined in claim 18, wherein each of said steady rest assemblies further comprises:
adjusting means for properly aligning said cradle with respect to said pipe rotating means.

29. A system as defined in claim 18, wherein said cradle and said pair of arms of each of said steady rest assemblies is a metal casting.

30. A system as defined in claim 26, wherein each of said air cylinders absorbs vibrational forces being transmitted to said tires by said pipe.

31. A system as defined in claim 23, further comprising:
raising means for elevating said V-rollers.

32. A system as defined in claim 18, further comprising:
a powered cart for grasping a section of pipe and axially transporting said pipe a preselected distance for proper positioning with respect to said pipe rotating means.

* * * * *